(12) United States Patent
Khripin et al.

(10) Patent No.: US 9,545,584 B2
(45) Date of Patent: Jan. 17, 2017

(54) FRACTIONATING NANOMATERIALS BY A LIQUID MULTIPHASE COMPOSITION

(71) Applicant: NATIONAL INSTITUTE OF STANDARDS AND TECHNOLOGY, Gaithersburg, MD (US)

(72) Inventors: Constantine Y. Khripin, Gaithersburg, MD (US); Ming Zheng, Rockville, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 391 days.

(21) Appl. No.: 14/189,619

(22) Filed: Feb. 25, 2014

(65) Prior Publication Data

US 2014/0174991 A1    Jun. 26, 2014

Related U.S. Application Data

(60) Provisional application No. 61/768,560, filed on Feb. 25, 2013.

(51) Int. Cl.
  *B01D 11/02* (2006.01)
  *B01D 15/02* (2006.01)
  (Continued)

(52) U.S. Cl.
  CPC ............. *B01D 15/02* (2013.01); *B01D 11/028* (2013.01); *C01B 31/0266* (2013.01); *B82Y 40/00* (2013.01);
  (Continued)

(58) Field of Classification Search
  CPC ... B01D 11/02; B01D 11/028; B01D 11/0288; B01D 15/00; B01D 15/02; B01D 17/02; B01D 17/0217; B01D 21/26; B01D 21/262; B01D 21/28; B01D 21/283; B01D 21/286; C01B 31/02; C01B 31/0206; C01B 31/022; C01B 31/0226; C01B 31/0246; C01B 31/026; C01B 31/0266; C01B 31/0273; C01B 2202/02; C01B 31/22; C01B 31/36; B03B 5/00; B82Y 30/00; B82Y 40/00
  (Continued)

(56) References Cited

U.S. PATENT DOCUMENTS 7,374,685 B2   5/2008  Sun
7,578,941 B2   8/2009  Ziegler
(Continued)

OTHER PUBLICATIONS

Publication: Mark C. Hersam, "Progress towards monodisperse single-walled carbon nanotubes", Nature Nanotechnology, vol. 3, Jul. 2008, pp. 387-394.*
(Continued)

*Primary Examiner* — Joseph Drodge
(74) *Attorney, Agent, or Firm* — Toby D. Hain

(57) ABSTRACT

A process for fractionating a nanoparticle composition, the process includes combining a first polymer, a second polymer, and a solvent to form a fluid and contacting the nanoparticle composition with the fluid. The nanoparticle composition includes a plurality of first nanoparticles, a plurality of second nanoparticles, and a dispersant disposed on an exterior surface of the first nanoparticles and the second nanoparticles. Fractionating the nanoparticle composition also includes forming a multiphase composition that includes a first phase and a second phase by partitioning the first polymer and the second polymer such that a concentration of the first polymer is greater than a concentration of the second polymer in the first phase, and the concentration of the second polymer is greater than the first polymer in the second phase, wherein the solvent is present
(Continued)

in the first phase and the second phase. Additionally, the process includes apportioning the first nanoparticles and the second nanoparticles among the first phase and the second phase to fractionate the nanoparticle composition, based on a relative affinity of the first nanoparticles and the second nanoparticles for the first polymer and the second polymer, wherein the first nanoparticles are present in the first phase and substantially absent in the second phase, and the second nanoparticles are present in the second phase and substantially absent in the first phase.

19 Claims, 6 Drawing Sheets

(51) Int. Cl.
  *B01D 17/02* (2006.01)
  *C01B 31/02* (2006.01)
  *B03B 5/00* (2006.01)
  *B82Y 40/00* (2011.01)
(52) U.S. Cl.
  CPC ........ *C01B 2202/02* (2013.01); *C01B 2202/22* (2013.01); *C01B 2202/36* (2013.01)
(58) Field of Classification Search
  USPC ....... 210/634, 638, 639, 660, 787, 789, 800; 423/460, 461, 445 B; 977/734, 735, 737, 977/738, 740, 745, 750, 751, 845, 847, 977/848
  See application file for complete search history.

(56) References Cited

U.S. PATENT DOCUMENTS

| | | | | |
|---|---|---|---|---|
| 2003/0185741 | A1* | 10/2003 | Matyjaszewski | B82Y 10/00 423/445 R |
| 2006/0201390 | A1* | 9/2006 | Lahann | B82Y 10/00 106/401 |
| 2008/0245186 | A1* | 10/2008 | Yang | B22F 9/24 75/362 |
| 2009/0173918 | A1* | 7/2009 | Hersam | B82Y 30/00 252/502 |
| 2010/0044230 | A1* | 2/2010 | Papadimitrakopoulos | B01D 15/08 204/547 |
| 2010/0166624 | A1* | 7/2010 | Raston | B82Y 30/00 423/1 |
| 2010/0166637 | A1* | 7/2010 | Ziegler | B01D 11/0492 423/447.1 |
| 2010/0326891 | A1* | 12/2010 | Wang | B82Y 30/00 209/132 |
| 2012/0025150 | A1* | 2/2012 | Hersam | B03D 3/00 252/511 |

OTHER PUBLICATIONS

Publication: Menard-Moyon et al, "Separation of Semiconducting from Metallic Carbon Nanotubes by Selective Functionalization with Azomethine Ylides", J. Am. Chem. Soc., vol. 128, published 2006, pp. 6552-6553.*
Publication: Maeda et al, "Large-Scale Separation of Metallic and Semiconducting Single-Walled Carbon Nanotubes", J. Am. Chem. Soc., vol. 127, published 2005, pp. 10287-10290.*
Akbulut et al., Nano Lett. 12,4060 (2012).
Mace et al., JACS 134,9094 (2012).
Long et al., Anal. Chem. 78, 379 (2006).
Helfrich et al., Langmuir 21,8478 (2005).
Ziegler et al., Nano Lett. 5,2355 (2005).
Khripin et al., Spontaneous Lett. 6,822 JACS (2013) Supporting Information.
Khripin et al., Spontaneous Lett. S1 JACS (2013) Supporting Information.
Oliveira, An Integrated Process for the Purification of Antiobodies Based on Magnetic Particles and Aqueous Two-Phase Systems, Instituto Superior Tecnico, Nov. 2011, pp. 1-112.

* cited by examiner

FRACTIONATING NANOMATERIALS BY A LIQUID MULTIPHASE COMPOSITION

CROSS REFERENCE TO RELATED APPLICATIONS

This application claims the benefit of U.S. Provisional Application Ser. No. 61/768,560 filed Feb. 25, 2013, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BACKGROUND

Nanoparticles such as carbon nanotubes tend to be complex mixtures of different species that have divergent physical and chemical properties. Although carbon nanotubes exhibit great potential in applications such as diagnostic probes and nanoelectronics as well as structural additives in nanocomposites, their use can be limited due to the divergent properties. For example, an ensemble of synthesized carbon nanotubes typically include metallic and semiconducting species, which do not produce desired conduction when used in combination for use in certain devices and thus require separation for practical application in a device. Conventional separation of carbon nanotubes includes density gradient ultracentrifugation (DGU) and liquid chromatography (LC). These current separation methods use expensive equipment, are time-consuming, and produce a low yield of separated components. Moreover, DGU and LC are perforated with a small sample volume that is confined to a size of a centrifuge or chromatographic column.

Thus, development of an efficient process for separation of nanoparticles would be advantageous and would be favorably received in the art.

BRIEF DESCRIPTION

The above and other deficiencies are overcome by, in an embodiment, a process for fractionating a nanoparticle composition, the process comprising: combining a first polymer, a second polymer, and a solvent to form a fluid; contacting the nanoparticle composition with the fluid, the nanoparticle composition comprising: a plurality of first nanoparticles; a plurality of second nanoparticles; and a dispersant disposed on an exterior surface of the first nanoparticles and the second nanoparticles, wherein the first nanoparticles and the second nanoparticles are a carbon allotrope, a derivatized carbon allotrope, or a combination comprising at least one of the foregoing; forming a multiphase composition comprising a first phase and a second phase by partitioning the first polymer and the second polymer such that a concentration of the first polymer is greater than a concentration of the second polymer in the first phase, and the concentration of the second polymer is greater than the first polymer in the second phase, wherein the solvent is present in the first phase and the second phase; and apportioning the first nanoparticles and the second nanoparticles among the first phase and the second phase to fractionate the nanoparticle composition, based on a relative affinity of the first nanoparticles and the second nanoparticles for the first polymer and the second polymer, wherein the first nanoparticles are present in the first phase and substantially absent in the second phase, and the second nanoparticles are present in the second phase and substantially absent in the first phase.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that a combination of polymers disposed in a common solvent forms a fluid that exhibits a plurality of phases, which beneficially and surprisingly apportions a plurality of different types of nanoparticles among the phases. Moreover, a process embodying such apportionment is advantageous because it requires no specialized equipment, is completed in little time (e.g., about seconds), and has a high resolution for apportioning the different nanoparticles. Additionally, the process is scalable from a low volume of substances to a high volume with an attendant high throughput in attaining apportionment of the different nanoparticles.

In an embodiment, the process apportions a plurality of different nanoparticles of a same chemical composition according to their differing atomic structure or electronic structure. The process can apportion different types of carbon nanotubes according to a difference in their electronic properties (e.g., apportioning metallic from semiconducting carbon nanotubes) or atomic structures (e.g., chiralities such as apportioning (6,4)-carbon nanotubes and (6,5)-carbon nanotubes in different phases of the fluid.

Figure 1:
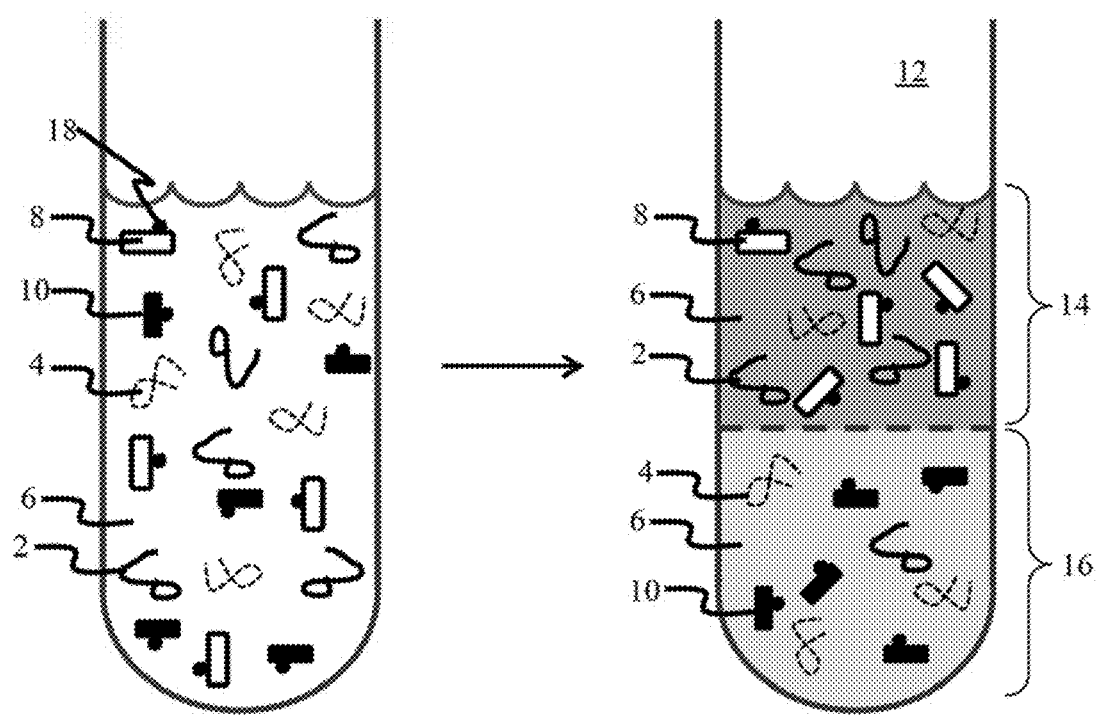
FIG. 1 shows formation of a multiphase composition from disposal of a nanoparticle composition in a fluid.

With reference to FIG. 1, a process for fractionating a nanoparticle composition includes combining a first polymer 2, a second polymer 4, and a solvent 6 to form a fluid and contacting the nanoparticle composition with the fluid. The nanoparticle composition includes a plurality of first nanoparticles 8, a plurality of second nanoparticles 10, and a dispersant 18 disposed on an exterior surface of the first nanoparticles 8 and the second nanoparticles 10. The process also includes forming a multiphase composition 12 including a first phase 14 and a second phase 16 by partitioning the first polymer 2 and the second polymer 4 such that a concentration of the first polymer 2 is greater than a concentration of the second polymer 4 in the first phase 14, and the concentration of the second polymer 4 is greater than the first polymer 2 in the second phase 16, wherein the solvent 6 is present in the first phase 14 and the second phase 16. The process further includes apportioning the first nanoparticles 2 and the second nanoparticles 4 among the first phase 14 and the second phase 16 to fractionate the nanoparticle composition, based on a relative affinity of the first nanoparticles 8 and the second nanoparticles 10 for the first polymer 2 and the second polymer 4. According to some embodiments, the first nanoparticles 8 are present in the first phase 14 and substantially absent in the second phase 16, and the second nanoparticles 10 are present in the second phase 16 and substantially absent in the first phase 14. Thus, the first nanoparticles and the second nanoparticles in the nanoparticle composition are apportioned amongst a plurality of immiscible liquid phases formed by a plurality of polymers in a common solvent, i.e., a solvent in which the plurality of polymers is soluble but which phase separation occurs due to the incompatibility of each polymer-solvent combination.

As used herein, "incompatibility" refers to a situation in which a system is heterogeneous due to phase separation occurring such that constituent (e.g., two) polymers are collected in different phases. It is contemplated that more than one phase contains a proportion of certain polymers, with each phase containing a greater proportion of a polymer over the amounts of other polymers present in that phase. In other words, for a two-phase system based on the first polymer and the second polymer), a first phase contains a greater proportion of the first polymer than the second polymer, and the second phase contains a greater proportion of the second polymer than the first polymer. This construct is extensible to a plurality of phases and a plurality of polymers, e.g., three, four, or more phases and three, four, or more polymers. In some embodiments, the number of phases is equal to the number of different polymers. In another embodiment, the number of phases is less than the number of different polymers.

The solvent is an inorganic compound or an organic compound that is a liquid at a temperature during which the nanoparticle composition is fractionated. In an embodiment, the solvent in the fluid is an aqueous solvent or a nonaqueous solvent, which is selected to be compatible with the first polymer and the second polymer. The aqueous solvent is water or a compound that is miscible with water. The nonaqueous solvent is a compound that is immiscible with water. Herein, a compound is miscible with water if it can combine with water in all proportions to produce a homogeneous solution. Conversely, an immiscible solvent cannot combine with water in all proportions.

Incorporation of the aqueous solvent or the nonaqueous solvent in the fluid to form, the multiphase composition allows use of a wide variety of first polymers and second polymers (particularly those that are insoluble in water) under an expansive set of conditions such as temperature, pH, and the like.

The solvent for forming the fluid can include a polar protic solvent, a polar aprotic solvent, a nonpolar solvent, or a combination comprising at least one of the foregoing, provided that each solvent in the combination is mutually compatible with each other. In some embodiments, the solvent can participate in hydrogen bonding with the first polymer, the second polymer, the nanoparticles, or a combination thereof. Such solvents include a functional group such as a hydroxy group, amino group, ether group, carbonyl group, carboxylic ester group, carboxylic amide group, ureido group, sulfoxide group, sulfonyl group, thioether group, nitrite group, and the like. Solvents that include such a functional group include an alcohol, amine, ether, ketone, aldehyde, ester, amide, urea, urethane, sulfoxide, sulfone, sulfonamide, sulfate ester, thioether, phosphine, phosphite ester, phosphate ester, and the like. According to an embodiment, the solvent includes water, an alcohol, a polyol, an amide, an amine, an ether, an ester, a carboxylic acid, an aldehyde, a ketone, or a combination comprising at least one of the foregoing solvents, provided that each solvent in the combination is mutually compatible.

Exemplary polar aprotic solvents include dimethylsulfoxide; sulfolane; ethylene carbonate; propylene carbonate; N,N-dimethylformamide; N,N-dimethylacetamide; N-methylpyrrolidone; dimethylsulfoxide; gamma butyrolactone; pyridine or a derivative thereof, an N-substituted (e.g., methyl-, ethyl-, formyl- or acetyl-derivatized) pyrrole, pyrrolidone, piperidine, morpholine, and the like; and the like.

In an embodiment, the solvent is an alcohol, including a primary alcohol, a secondary alcohol, or a tertiary alcohol. Exemplary alcohols include methanol, ethanol, (n- or iso-) propanol, (n-, sec-, i-, or t-) butanol, pentanol, octanol, cyclohexanol, benzyl alcohol, furfuryl alcohol, and the like. According to an embodiment, the solvent is ethylene glycol or a homolog thereof (e.g., diethylene glycol, triethylene glycol, and the like), propylene glycol or a homolog thereof (e.g., dipropylene glycol, tripropylene glycol, and the like), glycerol or an ether thereof, an ethylene or propylene glycol monoether (e.g., ethylene glycol methyl ether, ethylene glycol ethyl ether, ethylene glycol butyl ether, propylene glycol methyl ether, propylene glycol ethyl ether, and the like), and the like. In some embodiments, the solvent is a combination of a cellosolve or a carbitol with another polar solvent, e.g., N-methyl pyrrolidone, dimethylformamide, dimethylacetamide, dimethylsulfoxide, pyridine, ethylene or propylene glycol or their higher homologs, glycerol, and the like.

In an embodiment, the solvent is an amine, including a primary amine, secondary amine, or tertiary amine or an amine with a plurality of amino groups. Exemplary amines include hexadecyltrimethylammomium hydroxide, n-tetrabutylammonium hydroxide, tetraethylammonium hydroxide, tetramethylammonium hydroxide, tetrakis(decyl)ammonium hydroxide, dimethylethanol amine, triethanol amine, N-tert-Butyldiethanol amine. Exemplary alkylamines include ethyl amine, n-butylamine, t-butyl amine, n-hexylamine, n-decylamine, diethylamine, di(n-propylamine), di(iso-propyl amine), trimethylamine, triethylamine, tri(n-butylamine), tetramethyl ethylenediamine, dimethyl ethylenediamine, ethylenediamine, bis(hexamethylene)triamine, N,N',N''-trimethylbis(hexamethylene)triamine, and the like.

Exemplary nonaqueous solvents include an aliphatic hydrocarbon (hexane, heptane, 2,2,4-trimethylpentane, n-octane, cyclohexane), an alcohol (e.g., 2-methoxyethanol, butanol, phenol, and the like), an aldehyde (e.g., acetaldehyde, n-butyraldehyde, crotonaldehyde, 2-ethylhexaldehyde, isobutylaldehyde, propionaldehyde, and the like), an amine (e.g., triethylamine, trimethanol amine, and the like), a nitrogen-containing polar solvent (e.g., N,N-dimethylformamide, nitromethane, N-methylpyrrolidone, and the like), a sulfur compound (e.g., dimethyl sulfoxide), an aromatic hydrocarbon (e.g., benzene, toluene, xylene, and the like), a carbonic acid ester (e.g., tetrachloroethylene carbonate, dichloroethylene carbonate, and the like), a carboxylic acid (e.g., acetic acid, propionic acid, and the like), an ester (e.g., methyl acetate, ethyl, acetate, isopropyl acetate, n-propyl acetate, isobutyl acetate, n-butyl acetate, isobutyl isobutyrate, 2-ethylhexyl acetate, ethylene glycol diacetate, and the like), an ether (e.g., dimethyl ether, dioxane, tetrahydrofuran, methyl cellosolve, and the like), an ether alcohol (e.g., ethoxy ethanol, methoxy ethoxy ethanol, and the like), an ether ester (e.g., ethyl 3-ethoxypropionate and the like), a glycol ether ester (e.g., propylene glycol monomethyl ether acetate, ethylene glycol monoethyl ether acetate, ethylene glycol monobutyl ether acetate, diethylene glycol monobutyl ether acetate, and the like), a halogenated hydrocarbon (e.g., methylene chloride, chloroform, carbon tetrachloride, chlorobenzene, 1,1,1-trichloroethane, benzoyl fluoride, benzoyl chloride, and the like), a ketone (e.g., acetone, cyclohexanone, acetophenone, 4-hydroxy-4-methyl-2-pentanone, methyl ethyl ketone, methyl isobutyl ketone, methyl isoamyl ketone, methyl n-amyl ketone, diisobutyl ketone, cyclohexanone, isophorone, and the like), a phthalate (e.g., dibutyl phthalate, diethyl phthalate, dimethyl phthalate, dioctyl phthalate, dioctyl terephthalate, butyl octyl phthalate, butyl benzyl phthalate, alkyl benzyl, phthalate, and the like), an oil (e.g., mineral oil, silicone oil, and the like), and the like.

Further exemplary nonaqueous solvents include nitromethane, nitrobenzene, acetic anhydride, phosphorus oxychloride, benzonitrile, tetramethylsulfone, dioxane, 1,2-propanediol carbonate, benzyl cyanide, ethylene sulfite, isobutyronitrile, propionitrile, dimethyl carbonate, propylene carbonate, ethyl methyl carbonate, ethylene carbonate, phenyl phosphoric acid difluoride, n-butyronitrile, phenyl phosphoric acid dichloride, diphenyl phosphoric acid chloride, trimethyl phosphate, tributyl phosphate, hexamethylphosphoric amide, diglyme, polybenzimidazole, and the like.

These solvents can be used alone or combination. Further, the solvent can be substituted with a functional group (e.g., an alkyl group, alkenyl group, alkynyl group, or a functional as recited below for the nanoparticles).

In some embodiments the solvents is an aqueous solvent. In other embodiments, the solvent is a nonaqueous solvent. In yet other embodiments, the solvent includes a plurality of water miscible compounds and optionally water such that the solvent includes water in an amount less than or equal to 100 wt %, specifically less than or equal to 80 wt %, more specifically less than or equal to 50 wt %, further specifically less than or equal to 25 wt %, yet more specifically less than or equal to 10 wt %, or further more specifically less than or equal to 1 wt %, based on a total weight of the solvent. In some embodiments, the solvent contains no water, or water is substantially absent from the solvent.

The fluid and multiphase composition herein include a first polymer and a second polymer, which are referred to hereafter as "the polymers" for convenience. It will be appreciated that, although "first polymer" and "second polymer" are explicitly recited herein, the polymers can include more than two polymers, e.g., three polymers, four polymer, ten polymers, or greater. Further, since the solvent is an aqueous or nonaqueous solvent, the polymers are selected to be miscible with the solvent and form incompatible liquid phases (in the multiphase composition), with a portion of each polymer found in several phases. In some embodiments that contain more than two polymers, e.g., three polymers (i.e., an additional polymer), the additional polymer is present in a single phase or present in a plurality of phases in the multiphase composition. In an embodiment, the both of the first polymer and the second polymer are water soluble polymers or are water insoluble polymers.

The polymers independently can be an oligomer, a homopolymer, a copolymer, a block copolymer, an alternating block copolymer, a random copolymer, a random block copolymer, a graft copolymer, a star block copolymer, a dendrimer, or the like, or a combination comprising at last one of the foregoing. It is contemplated that the polymers are cross-linked or not cross-linked.

In an embodiment, the solvent is the aqueous solvent, and the polymers are selected to be soluble in the aqueous solvent, e.g., water. Thus, the first polymer or second polymer includes atoms or functional groups that attractively interact with the aqueous solvent. Examples of such atoms or functional groups are ionically charged atoms or groups, polarizable atoms or groups, polar groups, atoms or groups that can participate in hydrogen bonding, or a combination thereof.

According to an embodiment, the solvent is the nonaqueous solvent, and the polymers are selected to be soluble in the nonaqueous solvent, e.g., chloroform. Thus, the first polymer or second polymer includes atoms or functional groups that attractively interact with the nonaqueous solvent.

It is contemplated that the polymers include celluloses, chitosans, nucleic acids, polyacetals, polyacrylics, polyamideimides, polyamides, polyanhydrides, polyarylates, polyarylsulfones, polybenzimidazoles, polybenzothiazinophenothiazines, polybenzothiazoles, polybenzoxazoles, polycarbonates, polycarbonates, polydibenzofurans, polydioxoisoindolines, polyesters, polyether etherketones, polyether ketone ketones, polyetherimides, polyetherketones, polyethersulfones, polyimidazopyrrolones, polyimides, polyolefins, polyoxabicyclononanes, polyoxadiazoles, polyoxindoles, polyoxoisoindolines, polypeptides, polyphenylene sulfides, polyphosphazenes, polyphthalides, polypiperazines, polypiperidines, polypyrazinoquinoxalines, polypyrazoles, polypyridazines, polypyridines, polypyromellitimides, polypyrrolidines, polyquinoxalines, polysaccharides, polysilazanes, polysiloxanes, polystyrenes, polysulfides, polysulfonamides, polysulfonates, polysulfones, polytetrafluoroethylenes, polythioesters, polytriazines, polytriaxoles, polyureas, polyvinyl alcohols, polyvinyl chlorides, polyvinyl esters, polyvinyl ethers, polyvinyl halides, polyvinyl ketones, polyvinyl nitrites, polyvinyl thioethers, proteinaceous polymers, and the like, or a combination thereof.

In an embodiment, the polymers include a carbohydrate such as agar, agarose, alginic acid, amino dextran, amylopectin, amylose, carboxydextran, carboxylmethylcellulose, carboxymethyl chitosan, carboxymethylcellulose, carboxypolymethylene, carboxyvinyl polymer, cardlan, carrageenan, cellulose, chitin, chitosan, chondroitin, dermatan, dextran, dextran aldehyde, dextrin, diethylaminoethyl dextran chloride, ethylhydroxyethylcellulose, ficoll, galactocarolose, gellan gum, glucomannan, glycogen, guar gum, gum arabic, hyaluronic acid, hydroxyethylcellulose, hydroxymethylcellulose, hydroxypropyl methylcellulose, hydroxypropylcellulose, hydroxypropyldextran, hydroxypropylethylcellulose, hydroxypropylmethylcellulose, keratan, maltodextrin, methoxy polyethylene glycol, methoxycellulose, methylcellulose, pectic acid, pectin, pluran, poly(sialic acid), polyethylene glycol, polypropylene glycol, polyvinyl pyrrolidone, polyvinylalcohol, pullulan, pustulan, sodium carboxymethylcellulose, sodium carboxymethyldextran, sodium dextran sulfate, starch, succinylated aminodextran, tamarind seed gum, tragacanth gum, xanthum gum, and the like.

According to an embodiment, the first polymer or second polymer is a polysaccharide, e.g., an arabinan, fructan, fucan, fucoidan, galactan, galacturonan, glucan, inulin, levan, mannan, xylan, and the like. According to an embodiment, the polymer is a homopolymer or a heteropolymer that contains a repeat unit selected from an aldose, ketose, acid, or amine as follows: allose, altrose, arabinose, arginine, asparagine, aspartic acid, cellobiose, cysteine, dextrose, erythrose, erythrulose, fructose, galactosamine, galactose, galacturonic acid, glucosamine, glucaric acid, gluconic acid, glucosamine, glucose, glucuronic acid, glutamic acid, glutamine, glycine, gulose, guluronic acid, histidine, idose, lactose, lysine, lyxose, maltose, mannitol, mannose, mannuronic acid, neuraminic acid, psicose, ribose, ribulose, serine, sorbitol, sorbose, sucrose, tagatose, talose, threonine, threose, trehalose, tyrosine, xylose, xylulose, and the like.

According to an embodiment, the water soluble polymer is a polyether, e.g., polyethylene glycol. The polyether can be obtained by polymerization of a suitable monomer such as a substituted or an unsubstituted glycol (e.g., ethylene glycol, propylene glycol, butylene glycol, hexylene glycol, dipropylene glycol, diethylene glycol, tripropylene glycol, triethylene glycol, a poly glycol and the like), glycol ether (e.g., ethylene glycol monomethyl ether (EGMME), ethylene glycol monoethyl ether (EGMEE), ethylene glycol monopropyl ether (EGMPE), ethylene glycol monoisopropyl ether, ethylene glycol monobutyl ether (EGMBE), ethylene glycol monophenyl ether, ethylene glycol monobenzyl ether, diethylene glycol monomethyl ether (DEGMME), diethylene glycol monoethyl ether (DEGMEE), diethylene glycol mono-n-butyl ether (DEGMBE), dipropylene glycol monomethyl ether (DPGMEE), and the like), dialkyl ether (e.g., ethylene glycol dimethyl ether (EGDME), ethylene glycol diethyl ether (EGDEE), ethylene glycol dibutyl ether (EGDBE), and the like), ester (e.g., ethylene glycol methyl ether acetate (EGMEA), ethylene glycol monethyl ether acetate (EGMEEA), ethylene glycol monobutyl ether acetate (EGMBEA), and the like), and the like.

In an embodiment, the polymer is a water soluble polymer. Such a polymer can be obtained from a commercial source or polymerized from nonionic, anionic, cationic monomers, or a combination thereof. Polymerization to form the water soluble polymer can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for making the water soluble polymer include nonionic monomers such as acrylamide, methacrylamide, N,N-di($C_1$-$C_8$ alkyl)acrylamide such as N,N-dimethylacrylamide, vinyl alcohol, vinyl acetate, allyl alcohol, hydroxyethyl methacrylate, acrylonitrile, and derivatives thereof. Such derivatives include, for example, acrylamide derivatives, specifically alkyl-substituted acrylamides or aminoalkyl-substituted derivatives of acrylamide or methacrylamide, and are more specifically acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide, N-tert-butylacrylamide, N-vinylformamide, N-vinylacetamide, acrylonitrile, methacrylonitrile, or a combination thereof.

Examples of anionic monomers for making the water soluble polymer include ethylenically unsaturated anionic monomers containing acidic groups including a carboxylic group, a sulfonic group, a phosphonic group, a salt thereof, a derivative thereof, or a combination thereof. In an embodiment, the anionic monomer is acrylic acid, methacrylic acid, ethacrylic acid, maleic acid, maleic anhydride, fumaric acid, itaconic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulphonic acid, allyl sulphonic acid, vinyl sulphonic acid, allyl phosphonic acid, vinyl phosphonic acid, or a combination thereof.

Examples of cationic monomers for making the water soluble polymer include an N,N-di-$C_1$-$C_8$ alkylamino-$C_1$-$C_8$ alkylacrylate (e.g., N,N-dimethyl amino ethyl acrylate), N,N-di-$C_1$-$C_8$ alkylamino-$C_1$-$C_8$ alkylmethacrylate (e.g., N,N-dimethyl amino ethyl methacrylate), including a quaternary form (e.g., methyl chloride quaternary forms), diallyldimethyl ammonium chloride, N,N-di-$C_1$-$C_8$ alkylamino-$C_1$-$C_8$ alkylacrylamide, and a quaternary form thereof such as acrylamidopropyl trimethyl ammonium chloride.

In an embodiment, the water soluble polymer is amphoteric, containing both cationic substituents and anionic substituents. The cationic substituents and anionic substituents occur in various stoichiometric proportions, including one-to-one, or one substituent is present in a greater stoichiometric amount than the other substituent. Representative amphoteric water soluble polymers include terpolymers of nonionic monomers, anionic monomers and cationic monomers.

Because the solvent is the nonaqueous solvent in some embodiments, the polymers herein include polymers that are insoluble in water. Exemplary water insoluble polymers include certain polymers recited above and more specifically a cellulosic polymer having have a degree of substitution, e.g., from 1 to 3. The degree of substitution is calculated as the average number of original hydroxyl groups on a monomer unit of the cellulosic polymer that are replaced with a substitute functional group. Certain cellulosic polymers are cellulose acylate, cellulose diacylate, cellulose triacylate, cellulose acetate, cellulose diacetate, cellulose triacetate, ethylcellulose, cellulose ethyl ethers, cellulose esters, cellulose ethers, cellulose ester ethers, and the like.

According to an embodiment, the water insoluble polymer includes polyethylene, polypropylene, polystyrene, polyacetal, copolymers of acrylic and methacrylic acid esters, or a homopolymer, or copolymer of an ethylenically unsaturated monomer. Exemplary water insoluble polymers thus also include polyvinyl acetate, vinyl acetate copolymers, styrene copolymers, acrylate copolymers, vinyl acrylic copolymers, polyurethanes, and combinations thereof.

A vinyl acetate copolymer includes, e.g., a reaction product from vinyl acetate and another monomer such as an alkyl(meth)acrylate, an unsaturated dialkyldicarboxylic acid (e.g., vinyl acetate dioctyl maleate copolymer and vinyl acetate dibutyl maleate copolymer), ethylene (e.g., vinyl acetate vinyl neononanoate copolymer, vinyl acetate vinyl neodecanoate copolymer, and vinyl acetate vinyl neoundecanoate copolymer), and the like.

A styrene copolymer includes, e.g., a reaction product from styrene and an alkylacrylate monomer including, e.g., a C1-C8 alkyl acrylate (e.g., styrene butyl acrylate, styrene-acrylic acid, styrene-2-ethylhexyl acrylate, styrene-methyl acrylate, styrene-ethyl acrylate, and styrene-butyl acrylate), and the like.

An acrylate polymer or copolymer includes, e.g., a butyl acrylate-methyl methacrylate copolymer, a methyl acrylate polymer, an ethyl acrylate polymer, a butyl acrylate polymer, a carboxylated alkyl acrylate polymer or copolymer, and the like.

Additional water insoluble polymers that derive from an ethylenically unsaturated monomer include, e.g., a vinyl ester (e.g., vinyl versatate, vinyl formate, vinyl propionate, vinyl isobutyrate, vinyl valerate, vinyl pivalate, vinyl 2-ethylhexanoate, a vinyl ester of a saturated branched monocarboxylic acid (e.g., vinyl nonoate or vinyl decanoate), a vinyl ester of a long chain (e.g., C1 to C20) saturated or unsaturated, branched or unbranched fatty acid (e.g., vinyl laurate or vinyl stearate), a vinyl ester of benzoic acid, a vinyl ether, a vinyl halide (e.g., vinyl chloride), a vinylidene halide (e.g., vinylidene chloride), an alkyl vinyl ketone, N-vinyl carbazole, N-vinyl pyrrolidone, vinyl pyridine (e.g., 2-vinylpyridine and 4-vinylpyridine), an ethylenically unsaturated aromatic (e.g., styrene, an alkyl styrene, or chlorostyrene), an ethylenically unsaturated acid, an ethylenically unsaturated anhydride, an acrylate (e.g., an alkyl(meth)acrylate, allyl (meth)acrylate, or hydroxylated alkyl(meth)acrylate), an acrylamide, a substituted acrylamide, an acrylonitrile, a methacrylonitrile, an olefin, a divinyl benzene, a vinyl alkoxy silane (e.g., vinyl triethoxy silane), a vinyl diethylmethyl silane, a vinyl methyl dichlorosilane, a triphenyl vinyl silane, di-n-butyl maleate, dioctylmaleate, di-allyl maleate, di-allylmalonate, vinyl naphthalene, vinyl ethylene carbonate, epoxy butene, butadiene, ethylformamide, N-vinylformamide, N-vinyl-N-methylformamide, N-vinylimidazole, 1-vinyl-2-methylimidazole, 1-vinyl-2-methylimidazoline, N-vinylcaprolactam, allyl alcohol, diallyldimethylammonium chloride, acrolein, methacrolein, vinylcarbazole, 4-vinyl-1,3-dioxolan-2-one, 2,2-dimethyl-4 vinyl-1,3-dioxolane, 3,4-di-acetoxy-1-butane, and the like.

Exemplary vinyl ether monomers include methyl, ethyl, propyl, isobutyl, 2-ethylhexyl, cyclohexyl, 4-hydroxybutyl, decyl, dodecyl, octadecyl, 2-(diethylamino)ethyl, 2-(di-n-butylamino)ethyl and methyldiglycol vinyl ether, the corresponding allyl alkyl ethers, and combinations thereof.

Exemplary ethylenically unsaturated acid and ethylenically unsaturated anhydride monomers include acrylic acid, methacrylic acid, crotonic acid, itaconic acid, fumaric acid, and maleic acid, and anhydrides thereof, monovinyl adipate, and combinations thereof.

Exemplary acrylate monomers include methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, octyl acrylate, octyl methacrylate, iso-octyl acrylate, iso-octyl methacrylate, trimethyolpropyl triacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxybutenyl methacrylate, glycidyl methacrylate, acetoacetoxy ethyl methacrylate, acetoacetoxy ethyl acrylate, allyl methacrylates, methyoxybutenyl methacrylate, isobornyl methacrylate, vinyl(meth)acrylates, isopropenyl (meth)acrylate, cycloaliphaticepoxy(meth)acrylates; carbodiimide methacrylate, and combinations thereof.

Exemplary acrylamide monomers include acrylamide, methacrylamide, butyl acrylamide, ethyl acrylamide, N-tert-butylacrylamide, N-methylol(meth)acrylamide, and combinations thereof.

Exemplary olefin monomers include ethylene, propylene, butene, isobutylene, pentene, cyclopentene, hexane, cyclohexene, octane, 1-3 butadiene, chloroprene, cyclobutadiene, isoprene, and combinations thereof.

Thus, in an embodiment, the water insoluble polymer is ethyl cellulose, hydroxypropyl ethyl cellulose, cellulose acetate phthalate, cellulose acetate, hydroxypropyl methyl cellulose phthalate, or a combination thereof. In another embodiment, the polymers are polyethylene glycol (PEG), polyacrylamide (PAM), dextran, polyvinyl pyrrolidone, or a combination thereof. In one embodiment, the first polymer is a carbohydrate, and the second polymer is a polyether.

According to an embodiment, the nanoparticle composition subject to fractionating includes the first nanoparticles and the second nanoparticles, collectively referred to hereafter as "the nanoparticles" for convenience. In some embodiments, the first nanoparticles and the second nanoparticles are a carbon allotrope, a derivatized carbon allotrope, or a combination comprising at least one of the foregoing.

The nanoparticles generally have, in a dimension, an average particle size of less than one micrometer ($\mu$m). As used herein "average particle size" refers to the number average particle size based on the smallest linear dimension of the nanoparticle, which may sometimes be referred to as "diameter." Particle size, including an average, maximum, or minimum particle size, can be determined by an appropriate method of sizing particles such as static or dynamic light scattering (SLS or DLS), optical absorption, fluorescence spectroscopy, or atomic force microscopy, for example. The nanoparticles include both particles having an average particle size of 250 nanometers (nm) or less, and particles having an average particle size of greater than 250 nm to less than 1 $\mu$m, which are sometimes referred to as sub-micron sized particles. In an embodiment, the nanoparticles have an average particle size from 0.1 nm to 500 nm, specifically from 1 nm to 250 nm, more specifically from 0.1 nm to about 150 nm, and even more specifically from 1 nm to 75 nm. The nanoparticles are monodisperse, where all particles are substantially the same size with little variation, or polydisperse, where the particles have a range of sizes and are averaged. In some embodiments, polydisperse nanoparticles are used. In another embodiment, nanoparticles of different average particle sizes are used, and in this way, the particle size distribution of the nanoparticles is unimodal (exhibiting a single distribution), bimodal (exhibiting two distributions), or multi-modal (exhibiting more than one particle size distribution).

The minimum particle size for the smallest 5 percent of the nanoparticles is less than 5 nm, in an embodiment less than or equal to 0.7 nm, and in another embodiment less than or equal to 1 nm. Similarly, the maximum particle size for 95% of the nanoparticles is greater than or equal to 0.7 nm, in an embodiment greater than or equal to 1 nm, and in another embodiment greater than or equal to 2 nm.

The nanoparticles disclosed herein include a fullerene, a single-walled nanotube, a multi-walled nanotube, or a combination comprising at least one of the foregoing.

Fullerenes include cage-like hollow allotropic forms of carbon possessing a polyhedral structure with, e.g., from 20 to 100 carbon atoms. For example, C60 (known as buckminsterfullerene) is a fullerene having 60 carbon atoms with high symmetry ($D_{5h}$) and is a relatively common, commercially available fullerene. Exemplary fullerenes include C30, C32, C34, C38, C40, C42, C44, C46, C48, C50, C52, C60, C70, C76, and the like.

Nanotubes include carbon nanotubes, metallated nanotubes, or a combination comprising at least one of the foregoing. Nanotubes are tubular fullerene-like structures having open or closed ends and which are inorganic and made entirely or partially of carbon or another atom (e.g., boron, nitrogen, and the like). In an embodiment, the nanotubes include additional components such as metals or metalloids, which are incorporated into the structure of the nanotube, included as a dopant, form a surface coating, or a combination comprising at least one of the foregoing. The nanotubes are single-walled nanotubes (SWNTs) or multi-walled nanotubes (MWNTs).

As used herein, the term "carbon nanotube" refers to a variety of hollow, partially filled and filled forms of rod-shaped and toroidal-shaped hexagonal graphite layers. Examples of hollow carbon nanotubes include single-walled carbon nanotubes, multi-walled carbon nanotubes, carbon nanotoroids, branched carbon nanotubes, armchair carbon nanotubes, zigzag carbon nanotubes, as well as chiral carbon nanotubes. Filled carbon nanotubes include carbon nanotubes that contain various other atomic, molecular, or atomic and molecular species within its interior. Exemplary filled carbon nanotubes include nanorods (which are nanotubes filled with a material such an oxide, carbide, or nitride), carbon nanofibers having carbon within its interior, and the like. A carbon nanotube that has a hollow interior can be filled with a non-carbon material using wet chemistry techniques to produce a filled carbon nanotube.

Carbon nanotubes (CNTs) can be imagined as a cylindrical, rolled-up rectangular strip of graphene. The CNTs can have one of several geometrical arrangements of the lattice carbon atoms in general, single-walled nanotubes are distinguished from each other by a double index (n, m), where n and m are integers that describe how to cut a strip of graphene such that its edges join seamlessly when the strip is wrapped onto a surface of a cylinder. For (n, n)-SWNTs, the resultant SWNT is an "arm-chair" SWNT. The label "arm chair" indicates that, when the SWNT is cut perpendicularly to the tube axis, only the sides of the hexagons (from the graphene hexagonal carbon lattice) are exposed, and their pattern around a periphery of the tube edge resembles the arm and seat of an arm chair repeated n times. For (n, m=0), the resultant SWNT is "zigzag" or (n,0)-SWNT, and the label "zigzag" indicates that, when the tube is cut perpendicular to the tube axis, the atoms located at the edge of the tube have a zigzag arrangement. For (n≠m, m≠0), the resulting SWNT has chirality. Chiral SWNTs have a left-handed or a right-handed screw axis, like DNA. Nanocone SWNTs have a first end of larger diameter than a diameter of its other end. SWNTs in which the ends attach to each other form a torus shape referred to as a "nanotoroid."

Furthermore, the electronic properties of SWNTs are dependent on their conformation. Allowed electronic wave functions of SWNTs are different from an infinite two-dimensional electronic system of graphene or a hexagonal graphite monolayer. A periodic boundary condition exists in SWNTs for propagation of electrons around the circumference of the SWNT. As such, SWNTs have a different electronic band structure for different conformations of SWNTs. Consequently, SWNTs are either metallic (which are highly electrically conductive) or are semiconducting (which have a bandgap from a few millielectron volts (meV) to one electron volt (eV)). For n=m or n–m a multiple of three, the SWNT is metallic. For any other n, m combination, the SWNT is semiconducting. Accordingly, armchair nanotubes are metallic and have an extremely high electrical conductivity.

The carbon atoms in the carbon nanotube can be displaced or substituted by another element. In an embodiment, the carbon nanoparticles can include a metal or metalloid oxide such as silica, alumina, titania, tungsten oxide, iron oxides, combinations thereof, or the like; a metal or metalloid carbide such as tungsten carbide, silicon carbide, boron carbide, or the like; a metal or metalloid nitride such as titanium nitride, boron nitride, silicon nitride, or the like; or a combination comprising at least one of the foregoing.

In some embodiments, the nanoparticles can include a metal such as an alkali metal, an alkaline earth metal, an inner transition metal (a lanthanide or actinide), a transition metal, or a post-transition metal. Examples of such metals include magnesium, aluminum, iron, tin, titanium, platinum, palladium, cobalt, nickel, vanadium, chromium, manganese, cobalt, nickel, zirconium, ruthenium, hafnium, tantalum, tungsten, rhenium, osmium, alloys thereof, or a combination comprising at least one of the foregoing. In other embodiments, the nanoparticles include those coated with one or more layers of metals such as iron, tin, titanium, platinum, palladium, cobalt, nickel, vanadium, alloys thereof, or a combination comprising at least one of the foregoing.

According to an embodiment, the nanoparticles are a carbon allotrope, a derivatized carbon allotrope, or a combination comprising at least one of the foregoing. Derivatized nanoparticles include functionalized carbon allotropes or carbon atom deletion or substitution with another atom, e.g., a nonmetal (e.g., O, N, P, S, F, and the like), a metal, a metalloid, a poor metal, and the like. The nanoparticles can be derivatized to include a variety of different functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like. In an embodiment, the nanoparticles include a combination of derivatized nanoparticles and underivatized nanoparticles. For example, the surface or edges of the nanoparticle is derivatized to increase dispersibility in or interaction with the polymers. In an embodiment, the derivatized nanoparticle hydrophilic, hydrophobic, oxophilic, lipophilic, or may possess a combination of these properties to provide a balance of desirable net properties by incorporation of a functional group. According to an embodiment, the nanoparticle is derivatized to include a functional group that is hydrophilic, hydrophobic, oxophilic, lipophilic, or oleophilic.

In an exemplary embodiment, the nanoparticle is derivatized by, for example, amination to include amine groups, where animation may be accomplished by nitration followed by reduction, or by nucleophilic substitution of a leaving group by an amine, substituted amine, or protected amine, followed by deprotection as necessary. In another embodiment, the nanoparticle is derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups.

Where the functional groups are alkyl, aryl, aralkyl, alkaryl, functionalized polymeric or oligomeric groups, or a combination of these groups, the functional groups are attached through intermediate functional groups (e.g., carboxy, amino) or directly to the derivatized nanoparticle by a carbon-carbon bond without intervening heteroatoms, a carbon-oxygen bond (where the nanoparticle contains an oxygen-containing functional group such as hydroxy or carboxylic acid), or by a carbon-nitrogen, bond (where the nanoparticle contains a nitrogen-containing functional group such as an amine or an amide). In an embodiment, the nanoparticle can be derivatized by metal mediated reaction with a C6-30 aryl or C7-30 aralkyl halide (F, Cl, Br, I) in a carbon-carbon, bond forming step, such as by a palladium-mediated reaction such as the Stille reaction, Suzuki coupling, or diazo coupling or by an organocopper coupling reaction.

In another embodiment, the nanoparticles (e.g., a fullerene or carbon nanotube) is directly metallated by reaction with e.g., an alkali metal such as lithium, sodium, or potassium, followed by reaction with a C1-30 alkyl or C7-30 alkaryl compound with a leaving group such as a halide (Cl, Br, I) or other leaving group (e.g., tosylate, mesylate, etc.) in a carbon-carbon bond forming step. The aryl or aralkyl halide (or the alkyl or alkaryl compound) can be substituted with a functional group such as hydroxy, carboxy, ether, or the like. Exemplary groups include hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; alkaryl groups such as benzyl groups attached via the aryl portion, such as in a 4-methylphenyl, 4-hydroxymethylphenyl, or 4-(2-hydroxyethyl)phenyl (also referred to as a phenethyl-alcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like.

In another embodiment, the nanoparticle is further derivatized by grafting certain polymer chains to the functional groups. For example, polymer chains such as acrylic chains having carboxylic acid functional groups, hydroxy functional groups, or amine functional groups; polyamines such as polyethyleneamine or polyethyleneimine; or poly(alkylene glycols) such as poly(ethylene glycol) and poly(propylene glycol) can be included by reaction with functional groups.

The degree of functionalization varies from 1 functional group for every 5 carbon centers to 1 functional group for every 100 carbon centers, depending on the functional group, and the method of functionalization.

The nanoparticles, e.g., carbon nanotubes, can be produced by a method known in the art including chemical vapor deposition such as high-pressure carbon monoxide conversion (HiPco), laser ablation, arc discharge, plasma torch, coalescence, or specific catalytic processes such as CoMoCAT® (SouthWest NanoTechnologics Inc., Norman, Okla.). Current synthetic methods for producing, e.g., carbon nanotube produce significant quantities single-walled and multi-walled carbon nanotubes with a broad distribution of chiralities and diameters. For example, certain nanoparticles syntheses produce multi-walled carbon nanotubes having an outer wall diameter from 0.9 nm to 100 nm and single-walled carbon nanotubes having a diameter from 0.5 nm to 3 nm. As such, many nanoparticle compositions include a plurality of different carbon nanotubes and carbonaceous impurities. Advantageously, the process herein separates the nanoparticles having, e.g., different diameters, different metallicity, chemical compositions, and the like.

In an embodiment, the first nanoparticles and the second nanoparticles have a different property including a length, chirality, handedness, (n,m) index, metallicity, or a combination comprising at least one of the foregoing. In some embodiments, the first nanoparticles and the second nanoparticles include a functional group, which includes carboxy, epoxy, ether, ketone, amine, hydroxy, alkoxy, alkyl, aryl, aralkyl, alkaryl, lactone, a functionalized polymeric or oligomeric group, or a combination comprising at least one of the foregoing.

In an embodiment, the nanoparticles have a dispersant disposed, on an external surface of the nanoparticle. The dispersant aids dispersion of the nanoparticles in the solvent and among the polymers to facilitate fractionating the nanoparticle composition as well as fostering colloidal stability. The dispersant associates with the nanoparticles in various ways, including covalent bonds between the dispersant and atoms of the nanoparticle (e.g., surface atoms of the nanoparticle, including more than one surface atom), ion-dipole interactions, hydrogen bonding, Van Der Waals interactions, adhesion of the dispersant onto the nanoparticle via a π-cation or π-π interactions, or surface adsorption (including chemisorption or physisorption). Due to the dispersant, the nanoparticles are prevented from aggregating. Thus, when placed in the solvent, the fluid, or the multiphase composition, the nanoparticles including the dispersant form a stable suspension in the solvent and are also disperse well among the polymers. Further, the nanoparticles can be attracted to and have affinity for certain solvents or certain polymers. Due to the surface of the nanoparticles having the dispersant, the nanoparticles can be made to be miscible in the aqueous solvent or the nonaqueous solvent. The dispersant can be disposed on nanoparticles without functional groups or disposed on nanoparticles with attached functional groups, i.e., derivatized nanoparticles.

In an embodiment, the dispersant includes a polyether (e.g., F68 (a derivatized polyethylene glycol commercially available from BASF), octylphenol polyethylene glycol ether, and the like), a sulfate or sulfonate (e.g., sodium dodecyl sulfate and sodium dodecyl benzene sulfonate), a bile salt, polyvinyl pyrrolidone, a surfactant, a polymeric material (including biopolymers such as nucleic acids and polypeptides), a flavin, a nitrogenous heterocyclic compound, a derivative thereof, or a combination comprising at least one of the foregoing.

The bile salt is a planar moiety with a charged face opposing a hydrophobic face. Exemplary bile salts include a salt (e.g., a sodium or potassium salt) of a conjugated or unconjugated cholate or cholate derivative including deoxycholates, chenodeoxycholates, taurodeoxycholates, glycochenodeoxycholates, ursodeoxycholates, glycoursodeoxycholates, and the like. In an embodiment, the dispersant bile salt is sodium cholate.

The surfactant can be ionic or nonionic. Ionic surfactants are classified into cationic surfactants, zwitterionic surfactants, and anionic surfactants. Examples of cationic surfactants include alkylamine salts, quaternary ammonium salts, and the like. Examples of zwitterionic surfactants include alkylbetaine surfactants and amine oxide surfactants. Examples of anionic surfactants include aromatic sulfonic add surfactants such as alkylbenzene sulfonates such as dodecylbenzene sulfonate, and dodecylphenyl ether sulfonates; monosoap anionic surfactants; ether sulfate surfactants; phosphate surfactants; carboxylic acid surfactants; and the like. In an embodiment, the dispersant is a surfactant that contains an aromatic ring, i.e., aromatic ionic surfactant. It is contemplated that aromaticity of the dispersant imparts increased association between the dispersant and the nanoparticles, either due to increased surfactant number density adhered to the nanoparticles or tighter binding therebetween, which enhances the dispersibility of the nanoparticles in the fluid or multiphase composition, and increases the efficiency of apportioning the nanoparticles among the phases.

Exemplary nonionic surfactants include sugar ester surfactants such as sorbitan fatty acid ester and polyoxyethylene sorbitan fatty acid ester; fatty acid ester surfactants such as polyoxyethylene resin acid ester and polyoxyethylene fatty acid diethyl; ether surfactants such as polyoxyethylene alkyl ether, polyoxyethylene alkylphenyl ether, and polyoxyethylene polypropylene glycol; and aromatic nonionic surfactants such as polyoxyalkylene octylphenyl ether, Triton X-series, Tween 20, Tween 80, polyoxyalkylene nonylphenyl ether, polyoxyalkyl dibutylphenyl ether, polyoxyalkyl styrylphenyl ether, polyoxyalkyl benzylphenyl ether, polyoxyalkyl bisphenyl ether, and polyoxyalkyl cumylphenyl ether. In the above, alkyl is, e.g., a C1 to C20 alkyl.

Exemplary polymeric materials for use as the dispersant include a water soluble species such as polyvinyl alcohol, polyvinyl pyrrolidone, ammonium polystyrene sulfonate, or sodium polystyrene sulfonate; a saccharide polymer such as carboxymethylcellulose or a salt thereof (e.g., a sodium or ammonium salt), methylcellulose, hydroxyethylcellulose, amylose, cycloamylose, or chitosan; a conductive polymer such as polythiophene, polyethylenedioxythiophene, polyisothianaphthene, polyaniline, polypyrrole, polyfluorene, or polyacetylene or a derivative thereof; a nucleic acid; and the like. Exemplary nucleic acids include a ribonucleic acid (RNA), a deoxyribonucleic acid (DNA), a threose nucleic acid (TNA), a glycol nucleic acid (GNA), a peptide nucleic acid (PNA), a locked nucleic acid (LNA), an antisense RNA, a tRNA, and the like.

Exemplary flavins include riboflavin, flavin mononucleotides, flavin adenine dinucleotide, a derivative thereof, (e.g., 10-dodecyl-7,8-dimethyl-10H-benzo[g]pteridine-2,4-dione), a pteridine or derivative thereof, a pterin or derivative thereof, and the like.

Nitrogenous heterocyclic compounds include compounds that contain a nitrogen heterocyclic ring such as a pyrimidine ring, pyridazine ring, pyridine ring, phenazine ring, indole ring, isoindole ring, imidazole ring, benzimidazole ring, purine ring, pyrazole ring, indazole ring, oxazole ring, benzoxazole ring, isoxazole ring, benzisoxazole ring, thiazole ring, benzothiazole ring, quinoline ring, isoquinoline ring, pyrazine ring, quinoxaline ring, acridine ring, quinazoline ring, pyridazine ring, cinnoline ring, phthalazin ring, triazine ring, nucleobase ring, and the like. Exemplary nitrogenous heterocyclic compounds include adenine, guanine, hypoxanthine, xanthine, uracil, thymine, cytosine, 1-dodecyl-1H-pyrrolo[3,2-c]pyridine-4,6-diamine; 1-dodecyl-1H-benzo[h]quinazoline-2,4-dione; 2-amino-5-dodecyl-3,5-dihydro-pyrrolo[3,2-d]pyrimidin-4-one; 3-amino-5-dodecyl-5H-benzo[b][1,6]naphthyridin-1-one; 3-amino-5-dodecyl-5H-2,5-diaza-naphthacen-1-one; 3-amino-9-dodecyl-2,9-dihydro-2,4,9-triaza-fluoren-1-one; 3-amino-11-dodecyl-2,11-dihydro-2,4,11-triaza-benzo[b]fluoren-1-one; 3-amino-13-dodecyl-2,13-dihydro-2,4,13-triaza-indeno[1,2-b]anthracen-1-one: 3,7-diamino-9,10-didodecyl-2,6-diaza-anthracene-1,5-dione; 3,10-diamino-5,12-didodecyl-5,12-dihydro-2,5,7,9,12,14-hexaaza-pentacene-1,8-dione; 4-dodecyl-4H-benzo[f]quinazoline-1,3-dione, 5-dodecyl-5H-pyrido[4,3-b]indole-1,3-diamine; 5-dodecyl-5H-benzo[f]pyrido[4,3-b]indole-1,3-diamines; 5,10-dodecyl-pyrimido[4,5-g]quinazoline-2,4,7,9-tetraone; 7-amino-1-dodecyl-1H-[1,6]naphthyridin-5-one; 7-octyl-7H-pyrrolo[2,3-d]pyrimidin-4-ylamine; 7,14-didodecyl-7,14-dihydro-1,3,5,7,8,10,12,14-octaaxa-pentacene-2,4,9,11-tetraone; 8-dodecyl-8H-pteridine-2,4-dione; 9-dodecyl-9H-1,3,9-triaza-fluoren-4-ylamine; 8,9-dimethyl-12-dodecyl-12H-1,3,5,12-tetraaza-naphthacene-2,4-dione; 1'-dodecyl-9H-1,3,11-triaza-benzo[b]fluoren-4-ylamine; 12-dodecyl-12H-1,3,5,12-tetraaza-naphthacene; 14-dodecyl-4H-1,3,5,12-tetraaza-pentacene-2,4-dione; and the like.

It is contemplated that the dispersant is disposed on the nanoparticles (e.g., carbon nanotubes) in a random arrangement or assembled into a repeat pattern. In some embodiments, the dispersant wraps around the sidewall (circumference) of the carbon nanotubes. According to an embodiment, the dispersant is arranged around the sidewall of a carbon nanotube in a helical monolayer, a longitudinal arrangement, an annular arrangement, and the like.

In an embodiment, the multiphase composition, the fluid, the nanoparticle composition, or a combination thereof include an additive. The additive has various qualities such as varying a pH, viscosity, hydrophilicity, miscibility, salinity, density, color, conductivity of the multiphase composition, and the like. Exemplary additives include a pH agent, buffer, salt, surfactant, and the like.

According to an embodiment, the additive is a salt, e.g., a mineral salt (e.g., sodium bicarbonate, aluminum sulfate, sodium aluminate, aluminum acetate, aluminum acetylacetonate, aluminum formate, aluminum borate, aluminum octoate, aluminum oleate, aluminum palmitate, aluminum tartrate, aluminum acetotartrate, and the like), a metal salt (e.g., $NaCl$, $LiF$, $LiCl$, $LiBr$, $LiI$, $LiNO_3$, $LiCH_3COO$, $Li_2SO_4$, $Li_2CO_3$, $NaF$, $NaCl$, $NaBr$, $NaI$, $NaNO_3$, $NaCH_3COO$, $Na_2SO_4$, $Na_2CO_3$, $KF$, $KCl$, $KBr$, $KI$, $KNO_3$, $KCH_3COO$, $K_2SO_4$, $K_2CO_5$, $RbF$, $RbCl$, $RbBr$, $RbI$, $RbNO_3$, $RbCH_3COO$, $Rb_2SO_4$, $Rb_2CO_3$, $CsF$, $CsCl$, $CsBr$, $CsI$, $CsNO_3$, $CsCH_3COO$, $Cs_2SO_4$, $Cs_2CO_3$, $MgF_2$, $MgCl_2$, $MgBr_2$, $MgI_2$, $Mg(NO_3)_2$, $Mg(CH_3COO)_2$, $MgSO_4$, $MgCO_3$, $CaF_2$, $CaCl_2$, $CaBr_2$, $CaI_2$, $Ca(NO_3)_2$, $Ca(CH_3COO)_2$, $CaSO_4$, $CaCO_3$, $ErCl_3$, and the like), an organic salt (e.g., monosodium glutamate, phosphinates, hydrazinium salts, urates, diazonium salts, oxalate salts, methoxide salts, tartrates, iminium salts, trolamine salicylate, aluminium monostearate, triphenylmethyl hexafluorophosphate, organophosphates, choline chloride, and the like), a chaotropic salt, a kosmotropic salt, and the like.

The chaotropic salt interacts with the solvent (or components in the solvent, e.g., polymer-solvent interactions) to disrupt certain bonding, e.g., hydrogen bonding, between solvent molecules (or components in the solvent). The chaotropic salt can be a compound having a large ion (relative to $Mg^{2+}$ for example) or ions with low charge density, e.g., $Br^-$, $I^-$, $K^+$, $Cs^+$, and a suitable counter ion (e.g., guanidium, perchlorate, acetate, chloride, and the like).

Whereas chaotropic salts disrupt the solvent, a kosmotropic agent (such as kosmotropic salt) stabilizes solvent-solvent interactions. Due to the stabilization of the solvent by the kosmotropic salt, interactions of the polymers with the solvent and between the nanoparticles and polymers similarly are stabilized. Ionic kosmotropic species include small ions or high charge density ions. Exemplary kosmotropic ions are $SO_4^{2-}$, $PO_4^{3-}$, $Mg^{2+}$, $Li^+$, $Zn^{2+}$, $Al^{3+}$, and the like. A suitable counter ion is included with the kosmotropic ion such as a monoatomic or polyatomic ion, e.g., as in $NH_4SO_4$.

In some embodiments, the additive is a pH agent that mediates the pH of the fluid or multiphase composition. The pH can be adjusted by adding an alkaline solution. As an alkaline solution, a solution of ammonia or organic amine is used. Preferred organic amine is a nitrogen-containing organic compound such as ethanolamine, ethylamine, n-propylamine, isopropylamine, diethylamine, triethylamine, ethylenediamine, hexamethylenediamine, hydrazine, pyridine, piperidine, or hydroxypiperidine. Among these ammonia and organic amines, most preferred is ammonia. Similarly, the pH can be adjusted by adding an acid to the fluid. Exemplary acids include a mineral acid (e.g., HCl) or an organic acid (acetic acid, propionic acid, and the like).

In an aqueous solvent, the alkalinity or acidity is measured by pH. Increasing pH corresponds to increasing alkalinity, and decreasing pH corresponds to increasing acidity. In a nonaqueous solvent, the concept of pH does not have rigorous meaning; however, various compounds that increase pH in an aqueous solvent will increase an alkalinity in a nonaqueous solvent. Compounds that provide basicity or alkalinity in nonaqueous solvents include a basic salt such as the carbonates, borates, phosphates, oxides, and hydroxides of alkali and alkaline earth metals such as lithium, sodium, potassium, magnesium, and calcium; a basic salt of tetraalkylammonium ions such as tetra-n-butylammonium; and the like. Additional compounds that provide alkalinity include ammonia and substituted amines such as tri-n-butylamine.

In an embodiment, the pH is controlled by addition of the pH agent to affect the dispersability of the nanotubes. According to some embodiments, when an anionic surfactant (e.g., carboxymethylcellulose sodium salt) is used as the dispersant on the nanoparticles, a pH agent is added to achieve a pH greater than or equal to 7, specifically from 8 to 11. Without wishing to be bound by theory, it is believed that the dispersant more effectively disperses the nanoparticles as an electrostatic repulsion increases between surfactants. Consequently, changing the pH affects the ionic charge state of functional groups of the dispersant so that the dispersant coated nanoparticles can be electrically repelled by one another.

In an embodiment, the additive is a surfactant. The surfactant can be a surfactant recited above as a dispersant. Additionally, the surfactant includes fatty acids of up to 22 carbon atoms such as stearic acids and esters and polyesters thereof, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers and copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant can be anionic, cationic, zwitterionic, or non-ionic.

Exemplary cationic surfactants include alkyl primary, secondary, and tertiary amines, alkanolamides, quaternary ammonium salts, alkylated imidazolium, and pyridinium salts. Additional examples of the cationic surfactant include primary to tertiary alkylamine salts such as, for example, monostearylammonium chloride, distearylammonium chloride, tristearylammonium chloride; quaternary alkylammonium salts such as, for example, monostearyltrimethylammonium chloride, distearyldimethylammonium chloride, stearyldimethylbenzylammonium chloride, monostearyl-bis(polyethoxy)methylammonium chloride; alkylpyridinium salts such as, for example, N-cetylpyridinium chloride, N-stearylpyridinium chloride; N,N-dialkylmorpholinium salts; fatty acid amide salts such as, for example, polyethylene polyamine; and the like.

Exemplary anionic surfactants include alkyl sulfates, alkyl sulfonates, fatty acids, sulfosuccinates, and phosphates. Further examples of the anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

The nonionic surfactant can be, e.g., an ethoxylated fatty alcohols, alkyl phenol polyethoxylates, fatty acid esters, glycerol esters, glycol esters, polyethers, alkyl polyglycosides, amineoxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol mononyl ether); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name Pluronics, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate;

bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like Zwitterionic surfactants (which include a cationic and anionic functional group on the same molecule) include, for example, betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3_-]$, where R is an alkyl group). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5(CH_3)CH_2CH_2SO_3^-]$.

The amounts of the constituents in the multiphase composition can be selected to vary apportioning the nanoparticle composition.

In some embodiments, the nanotubes are present in the multiphase composition in an amount from 0.1 wt % to 95 wt %, specifically from 1 wt % to 30 wt %, and more specifically from 4 wt % to 16 wt %, based on a weight of the multiphase composition. Similarly, the solvent can be present in the multiphase composition in an amount from 10 wt % to 99 wt %, specifically from 50 wt % to 90 wt %, and more specifically from 75 wt % to 90 wt %, based on a weight of the multiphase composition.

According to an embodiment, a concentration of the first polymer and a concentration of the second polymer are selected to maximize resolution of the nanoparticles from the nanoparticle composition (e.g., the first nanoparticles and the second nanoparticles) during apportioning the nanoparticles. Thus, the first polymer is present in the multiphase composition in an amount from 1 wt % to 95 wt %, specifically from 1 wt % to 30 wt %, and more specifically from 4 wt % to 16 wt %, based on a weight of the multiphase composition. Likewise, the second polymer is present in the multiphase composition in an amount from 1 wt % to 95 wt %, specifically from 1 wt % to 30 wt %, and more specifically from 4 wt % to 16 wt %, based on a weight of the multiphase composition.

Figure 2:
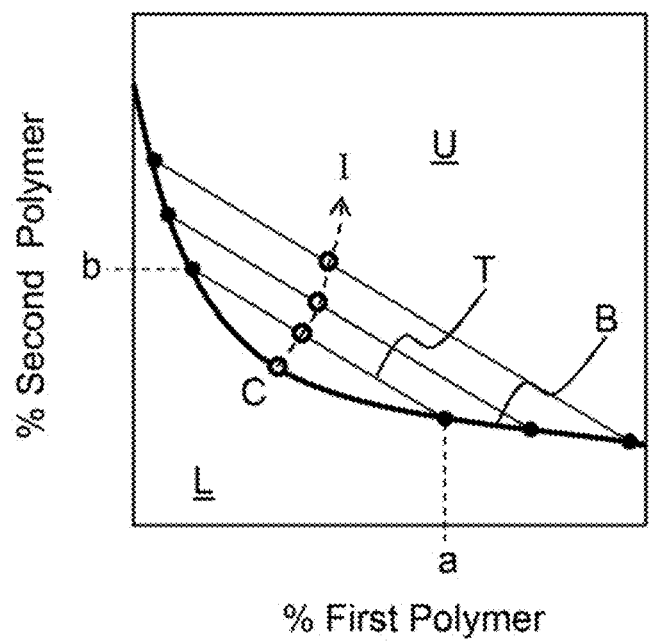
FIG. 2 shows an exemplary phase diagram of a two-polymer composition.

With reference to FIG. 2, which shows a generic phase diagram for a combination of two polymers in a solvent, the polymers can be selected to impart certain properties on the multiphase composition and fractionating the nanoparticle composition. In FIG. 2, the concentration of a second polymer is plotted versus the concentration of a first polymer. A binodal curve B separates a homogeneous phase L (for "lower" phase) and a heterogeneous phase U (for "upper" phase). A tie line (T1, T2, or T3) intersects two points along the binodal curve B. At the termini of the tie line T1, the composition of the first phase and the second phase are determined from the amounts listed for the first polymer (labelled as "a") and the second polymer (labelled as "b"). The critical point C (at which a tie line would intersect the binodal curve in a single point) is provided. Tie lines T1, T2, and T3 show points laying along isotropic curve I, corresponding to an identical relative concentration of the first polymer and the second polymer as at the critical point but occurring within the heterogeneous phase U. Fluids having a concentration of the polymers lying on curve I are referred to as isotropic.

With regard to the FIG. 2, in an embodiment, a relative concentration of the first polymer and the second polymer in the multiphase composition is near the binodal curve B and within the heterogeneous phase U in the phase diagram for the multiphase composition. The term "near" in the context of the phase diagram refers to polymer concentrations (in terms of the percentage of the first and second polymers) that are bounded between the binodal curve and values that are less than or equal to 400% of the binodal curve values within the heterogeneous region U.

Generally, as shown in FIG. 2, the percentages of the polymers is greater than a threshold amount for phase separation occur, i.e., the percentages of the polymers are selected to be in the heterogeneous region U of the phase diagram, above the binodal curve B. In an embodiment, the percentages of the polymers are near the critical point. In an embodiment, the percentage of the polymers are selected so that a ratio of the percentages of the first polymer 1 to the second polymer is the same as the ratio of percentages of the first polymer to the second polymer at the critical point, i.e., the amounts of the polymer are isotropic with the amount of the polymers at the critical point. In some embodiments, the polymers are selected to minimize the viscosity of the multiphase composition. Without wishing to be bound by theory, it is believed that an amount of time for the multiphase composition to form decreases as the viscosity of the solvent-first polymer-second polymer combination decreases. Further, as the time decreases for forming the multiphase composition, an amount of time decreases for apportioning the first and second nanoparticles in the nanoparticle composition. By selecting the percentages of the first polymer and the second polymer to be near that of the critical point (but not at the critical point) within the heterogeneous region of the phase diagram, lower amounts of the polymers are used.

In some embodiments, a ratio of a volume of the first phase to the second phase in the multiphase composition is from 0.01:100 to 100:0.01, specifically 10:1 to 1:10, and more specifically 1:1. The first nanoparticles and the second nanoparticles can be present in the multiphase composition in an amount from 0.0001 wt % to 5 wt %, specifically from 0.001 wt % to 0.01 wt %. In some embodiments, the first nanoparticles are present in the in the first phase in an amount from 0.0001 wt % to 1 wt %, based on a weight of the first phase. Similarly, the second nanoparticles are present in the second phase in an amount from 0.0001 wt % to 1 wt %, based on the weight of the second phase.

In some embodiments, the dispersant is disposed on the nanoparticles. The dispersant can be present on the nanoparticles in an amount effective to for the nanoparticles to form the colloid or to be dispersed in the first phase or the second phase.

In an embodiment, a process for fractionating a nanoparticle composition include combining a first polymer, a second polymer, and a solvent to form a fluid; contacting the nanoparticle composition with the fluid. The nanoparticle composition includes a plurality of first nanoparticles, a plurality of second nanoparticles, and a dispersant disposed on an exterior surface of the first nanoparticles and the second nanoparticles. Here, the first nanoparticles and the second nanoparticles are a carbon allotrope, a derivatized carbon allotrope, or a combination comprising at least one of the foregoing. Further, the process includes forming a multiphase composition that includes a first phase and a second phase by partitioning the first polymer and the second polymer such that a concentration of the first polymer is greater than a concentration of the second polymer in the first phase, and the concentration of the second polymer is greater than the first polymer in the second phase, wherein the solvent is present in the first phase and the second phase. Additionally, the process herein includes apportioning the first nanoparticles and the second nanoparticles among the first phase and the second phase to fractionate nanoparticle composition, based on a relative affinity of the first nanoparticles and the second nanoparticles for the first polymer and the second polymer. The first nanoparticles are present in the first phase and substantially absent in the second phase, and the second nanoparticles are present in the second phase and substantially absent in the first phase. As used herein, the term "substantially absent" refers to an item being present in an amount less than 5%, specifically less than 1, more specifically less than 0.1%, or completely absent or beyond detectable limits. Moreover, in the case when an item is substantially absent, if present at all, the item does not interfere with isolation or detection of any other item in the environment.

The polymers and the solvent can be added at any point in the process as long as they are present while apportioning the first nanoparticles and second nanoparticles. In an embodiment, they are combined before introducing the nanoparticle composition. Upon combining the polymers with the solvent, the fluid becomes opaque, indicative of the presence of the multiphase system. As the phases separate, the resulting composition is transparent.

In an embodiment, the process also includes contacting the first nanoparticles and the second nanoparticles with a compound and disposing the compound on the first nanoparticles and the second nanoparticles to form the dispersant. The compound is one of the aforementioned dispersants. In some embodiments, the dispersant is disposed on the nanoparticles before disposing the nanoparticle composition in the fluid. In some embodiments, the dispersant is disposed on the nanoparticles after disposing the nanoparticle composition in the fluid.

In a further embodiment, the process includes forming a colloidal suspension of the first nanoparticles and the second nanoparticles, wherein the first nanoparticles and the second nanoparticles are disposed in the fluid as the colloidal suspension. Forming the colloidal suspension includes, e.g., subjecting the nanoparticle composition to heating, shaking, sonicating, stirring, or a combination comprising at least one of the foregoing.

The multiphase composition thus formed includes a plurality of phases. It is contemplated that a single phase (or more) can be removed from the multiphase composition, e.g., by decanting, pipetting, and the like. Thus, the process also includes removing, from the multiphase composition, the first phase, the second phase, or a combination comprising at least one of the foregoing. Similarly, the process also includes removing the first nanoparticles from the first phase, the second nanoparticles from the second phase, or a combination comprising at least one of the foregoing.

In order to allow for adequate apportionment of the nanoparticles among the phases in the multiphase composition, the multiphase composition is incubated at a temperature from $-20°$ C. to $110°$ C. for a time from 10 seconds to 48 hours, specifically from $0°$ C. to $37°$ C. for a time from 60 seconds to 24 hours, and more specifically from $15°$ C. to $25°$ C. for a time from 4 minutes to 30 minutes.

According to an embodiment, the multiphase composition is subjected to centrifugation, gravity, and the like to increase a rate of formation of the plurality of phases in the multiphase composition.

In some embodiments, a certain amount of the first nanoparticles (or second nanoparticles) is transferred to a different phase in the multiphase composition. Thus, the process also includes changing a condition of the multiphase composition so that a portion of the first nanoparticles transfers to the second phase from the first phase, a portion of the second nanoparticles transfers to the second phase from the first phase, or a combination comprising at least one of the foregoing. In some embodiments, the plurality of first nanoparticles includes nanoparticles having different, indexes, e.g., greater than one index (n,m) (e.g., (n,m), (n',m), (n, m'), or (n'm') (where n≠n' if and m≠m' in which each is an arbitrary positive integer) such that the (n,m), (n',m), (n, m'), or (n',m') nanoparticles are separated from each other by introducing the additive to the multiphase composition. As an example, the (n,m') first nanoparticles are displaced from the first phase to the second phase upon introduction of the additive to the multiphase composition while (n,m) first nanoparticles are maintained in the first phase.

In an embodiment, the condition is temperature, pH, an amount of the first polymer present in the multiphase composition, an amount of the second polymer in the multiphase composition, an amount of an additive in the multiphase composition, or a combination comprising at least one of the foregoing. Thus, the process further includes changing a concentration of the first polymer, the second polymer, or a combination comprising at least one of the foregoing polymers to decrease an amount of the first nanoparticle in the first phase or decrease an amount of the second nanoparticle in the second phase.

It is also contemplated that the process includes controlling an interfacial tension between the first phase and the second phase, wherein controlling the interfacial tension includes changing a temperature of the multiphase composition, a concentration of the first polymer, a concentration of the second polymer, a pH of the first phase, a pH of the second phase, a concentration of a salt in the multiphase composition, or a combination comprising at least one of the foregoing.

The above process can be repeated using a portion of the first phase after an initial round of fractionating the nanoparticle composition. In an embodiment, after apportioning the first nanoparticles and the second nanoparticles, a portion of the first phase is removed from the multiphase composition. Thereafter the process includes forming a secondary multiphase composition comprising a plurality of phases by combining the first polymer, the second polymer, and the solvent to form a secondary fluid and contacting the portion with the secondary fluid. The first nanoparticles are apportioned in the portion among the plurality of phases in the secondary multiphase composition.

According to an embodiment, after fractionating the nanoparticle composition (e.g., after a single run of the process above), some of the nanoparticles (e.g., the first nanoparticles) may be included in more than one phase, even if in an amount that is nearly undetectable. To alleviate the presence of the first nanoparticle in more than one phase, after performing the process for fractionating the nanoparticle composition as described above, the process is repeated in an embodiment. In this manner, phases in the multiphase composition will contain a single type of nanoparticle (e.g., the first nanoparticle in the first phase). The phases will have a purity of 100%. In some embodiments, the phases have a purity of greater than or equal to 50%, greater than or equal to 75%, greater than or equal to 85%, greater than or equal to 90%, greater than or equal to 95%, or greater than or equal to 99%, based on the number of different types nanoparticles in a particular phase.

The multiphase composition also can be subjected to other processing. In an embodiment, a phase (e.g., the first phase or the second phase) is removed from the multiphase composition and subjected to further processing such as removal of the solvent from the phase. Removal of the solvent can be accomplished by evaporation. Evaporation of the solvent can occur at a pressure below atmospheric pressure. In one embodiment, temperature for solvent (e.g., water) removal is less than a boiling a point of the solvent, e.g., 100° C., or less.

In the process, fractionating the first nanoparticles and the second nanoparticles can be performed in a countercurrent chromatography configuration. Moreover, according to the process the first nanoparticles and the second nanoparticles are substantially absent from an interface between the first phase and the second phase.

The process can be performed at a pH of the multiphase composition from 0 to 14, specifically from 2 to 11. Fractionating the first nanoparticles and the second nanoparticles can be performed at a temperature from −20° C. to 110° C., specifically from 0° C. to 40° C. Additionally, fractionating the first nanoparticles and the second nanoparticles can be performed at a pressure from 10 kilopascals (kPa) to 100,000 kPA, specifically 90 kPa to 110 kPa. The time for carrying out the process can be from 10 seconds to 24 hours, specifically 10 minutes to 24 hours.

The phases have various properties. For example, the multiphase composition can have greater than two phases. In some embodiments, the first phase has a different density than the second phase. Besides their viscosity difference, the first phase and second phase can be isopycnic phases such that the first phase is disposed in the second phase or the second phase is disposed in the first phase.

The boiling point of the solvent can be selected by, e.g., adding an additive, selecting certain polymers, removing water or a low-boiling point compound in the case of a solvent that includes a plurality of aqueous or nonaqueous solvents. In an embodiment, the solvent has a boiling point at 760 Torr from 30° C. to 240° C., specifically from 45 Torr to 240 Torr, more specifically from 65° C. to 240° C.

The polymers can be provided in various shapes or forms such as fibers, beads, particles, or powders that are solvated by the solvent in the fluid and the multiphase composition. Further, the polymer can be comminuted for easier disposition in the solvent or to increase accessibility to the nanoparticles in the nanoparticle composition. The polymers can also be of varying molecular weights, such as high molecular weight polymers (that is, equal to or greater than 30,000 weight average molecular weight) or low molecular weight polymers (that is, less than 30,000 weight average molecular weight). The first polymer can have a molecular weight from 0.5 (kiloDaltons) kDa to 5000 kDa, specifically from 1 kDa to 1000 kDa. Additionally, the second polymer has a molecular weight from 0.5 kDa to 5000 kDa, specifically from 1 kDa to 1000 kDa. In some embodiments, an number average molecular weight ($M_n$) distribution of the first polymer in the first phase is different than a Mn of the first polymer in the second phase.

The first polymer can be present in the first phase in an amount from 0.1 wt % to 95 wt %, based on a weight the multiphase composition. The second polymer can be present in the second phase in an amount from 0.1 wt % to 95 wt %, based on a weight of the multiphase composition. Similarly, a weight ratio of the first polymer to the second polymer in the first phase is from 1:100 to 100:1.

In an embodiment, the first nanoparticles have a property that is different than the property of the second nanoparticles, the property comprising metallicity, chirality, shape, size, diameter, length, handedness, or a combination comprising at least one of the foregoing. The first nanoparticles and the second nanoparticles can have a length from 1 nm to 100 µm, specifically 10 to 10 µm; or a diameter from 0.3 nm to 100 nm, specifically from 0.4 nm to 50 nm.

According to an embodiment, the first nanoparticles in the first phase are metallic carbon nanotubes, and the second nanoparticles in the second phase are semiconducting carbon nanotubes. In some embodiments, the first nanoparticles in the first phase are left-handed carbon nanotubes, and the second nanoparticles in the second phase are right-handed carbon nanotubes. Handedness can be determined by, e.g., polarized fluorescence spectroscopy.

It is contemplated that a trapping energy of the first and second nanoparticles depends on a metallicity of the nanoparticles, chirality of the nanoparticles, or a combination comprising at least one of the foregoing. In this regard, the dispersant disposed on the first nanoparticles can be different than the dispersant disposed on the second nanoparticles.

Unlike low molecular weight compounds that separate into phases based on dissimilarity of structure/hydrophobicity (e.g., ether and water, octane and water, and the like), the polymers herein separate into phases even for closely related polymers. Such phase separation for the polymers occurs at low concentration, e.g., a few percent of a particular polymer.

Several factors may affect fractionating the nanoparticles into individual phases of the multiphase system. Some factors include, e.g., size of nanoparticle, surface entity adsorbed on a nanoparticle, hydrophobicity of a nanoparticle, number of polar and nonpolar groups attached to the polymers in a phase, ionic composition of phase system, and pH of phase system.

In an embodiment, fractionating the nanoparticle composition is selective for size or metallicity of the nanoparticles. According to an embodiment, the process apportions the nanoparticles between the phases according to diameter of the nanoparticles, e.g., having a diameter less than or equal to 1000 nm, specifically less than or equal to 100 nm, and more specifically less than or equal to 10 nm. In an embodiment, the process apportions the nanotubes between the phases according to metallicity for nanotubes.

In some embodiments, the first nanoparticles are concentrated in the first phase by selecting conditions for apportioning the nanoparticles such that the second phase a has a volume that is much greater than a volume of the first phase, e.g., a ratio of the volume of the first phase to the second phase is 1:10. It is contemplated that a ratio of the volume of the first phase to the second phase is from 1:100 to 100:1, specifically from 1:20 to 20:1, and more specifically from 1:5 to 5:1.

The process herein is advantageous in that is readily scalable, can be performed in a short amount of time (e.g., seconds to minutes), uses relatively cheap and abundantly available starting materials (e.g., the solvent, polymers), requires no specialized equipment. As for scalability, fractionating the nanoparticle composition can be performed at low or very high concentrations (e.g., up to 1 mg/mL of nanoparticles in large volumes, e.g., 1 L). The total volume of the multiphase system is not limited provided that the plurality of nanoparticles is apportioned among phases of the multiphase system in a time that is reasonable for a given application. In an embodiment, a total volume of the multiphase system is greater than or equal to 1 microliter (µL), more specifically to Various apportionments of the nanoparticles are contemplated. For example, apportion can be diameter-dependent for small diameter nanotubes or metallicity-dependent for large diameter nanotubes. The process herein can be performed in tandem with other separation or extractions method such as size exclusion chromatography.

The processes and compositions herein have numerous advantageous uses. The process prepares apportioned nanoparticles that are separated based on a number of parameters, including size, diameter, metallicity, hydrophobicity, and the like. Additionally, a composition that includes phase-apportioned nanoparticles in the multiphase system herein can be used as a medium in, e.g., a bar code, an identity tag, a chromatic filter, a thermometer (based on temperature effects on apportionment of the plurality of nanoparticles among phases of the multiphase system), and the like. Due to the scalability of the volume of the multiphase system, the process and composition can be miniaturized (e.g., on a microliter scale) or can occur in a large-scale (e.g., on a liter or hundreds of liters scale).

As used herein, "substituted" means a compound or radical substituted with at least one (e.g., 1, 2, 3, 4, 5, 6 or more) substituents independently selected from a halide (e.g., $F^-$, $Cl^-$, $Br^-$, $I^-$), a hydroxyl, an alkoxy, a nitro, a cyano, an amino, an azido, an amidino, a hydrazine, a hydrazono, a carbonyl, a carbamyl, a thiol, a C1 to C6 alkoxycarbonyl, an ester, a carboxyl, or a salt thereof, sulfonic acid or a salt thereof, phosphoric acid or a salt thereof, a $C_1$ to $C_{20}$ alkyl, a $C_2$ to $C_{16}$ alkynyl, a $C_6$ to $C_{20}$ aryl, a $C_7$ to $C_{13}$ arylalkyl, a $C_1$ to $C_4$ oxyalkyl, a $C_1$ to $C_{20}$ heteroalkyl, a $C_3$ to $C_{20}$ heteroaryl (i.e., a group that comprises at least one aromatic ring, wherein at least one ring member is other than carbon), a $C_3$ to $C_{20}$ heteroarylalkyl, a $C_3$ to $C_{20}$ cycloalkyl, a $C_3$ to $C_{15}$ cycloalkenyl, a $C_6$ to $C_{15}$ cycloalkynyl, a $C_5$ to $C_{15}$ heterocycloalkyl, or a combination including at least one of the foregoing, instead of hydrogen, provided that the substituted atom's normal valence is not exceeded.

The compositions and methods herein are further illustrated by the following examples, which are non-limiting.

EXAMPLES

Example 1

Enrichment of Metallic SWCNTs

Figure 3:
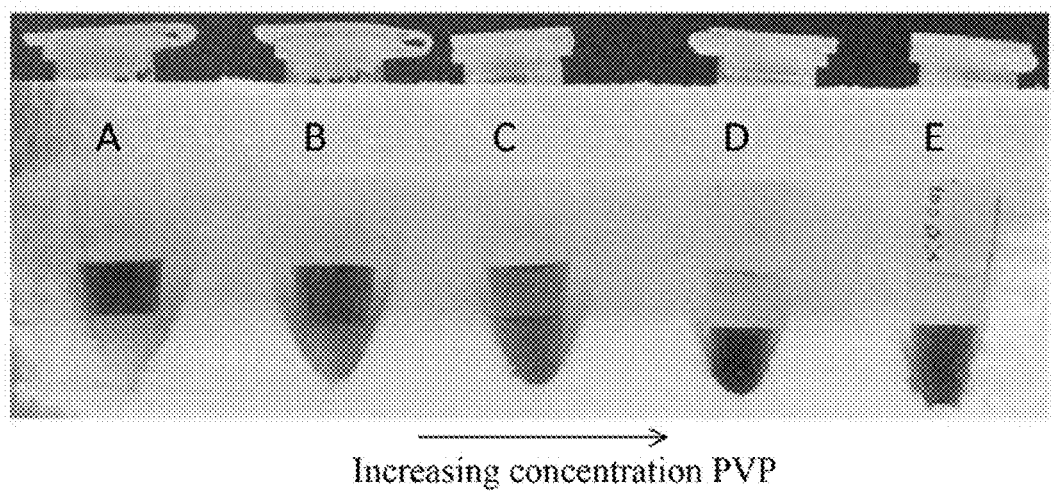
FIG. 3 shows a photograph of tubes containing different amounts of polyvinylpyrrolidone obtained according to Example 1.

A sample of colloidal single-walled carbon nanotubes (cSWCNTs) was prepared by dispersing HiPco synthesized single-walled carbon nanotubes (SWCNTs, average diameter 0.9 nm) in water having 2 wt % sodium dodecylsulfate (SDS), based on a total weight of the sample. An aliquot of the cSWCNTs sample was combined with dextran (68 kDa), PEG (6 kDa), and SDS to prepare a composition having 11.2 wt % dextran, 7.0 wt % PEG, 1 wt % SDS, based on a weight of the composition, and 10 µg/mL cSWCNTs. The composition was subjected to vortex mixing for 5 seconds and subsequently was centrifuged at 17,000 g for 30 seconds. Two phases (an upper phase and a lower phase) formed respectively having, as a dominant polymer, PEG (in the upper phase) and dextran (in the lower phase). The SWCNTs initially apportioned into the upper phase. As shown in FIG. 3, some amount of the SWCNTs transferred from the upper phase to the lower phase upon addition of polyvinyl pyrrolidone (PVP) to the composition at respective concentrations of 0.25 µg/mL (tube "A"), 0.5 µg/mL (tube "B"), 0.75 µg/mL (tube "C"), 1.0 µg/mL (tube "D"), and 1.5 µg/mL µg/mL (tube "E").

Figure 4:
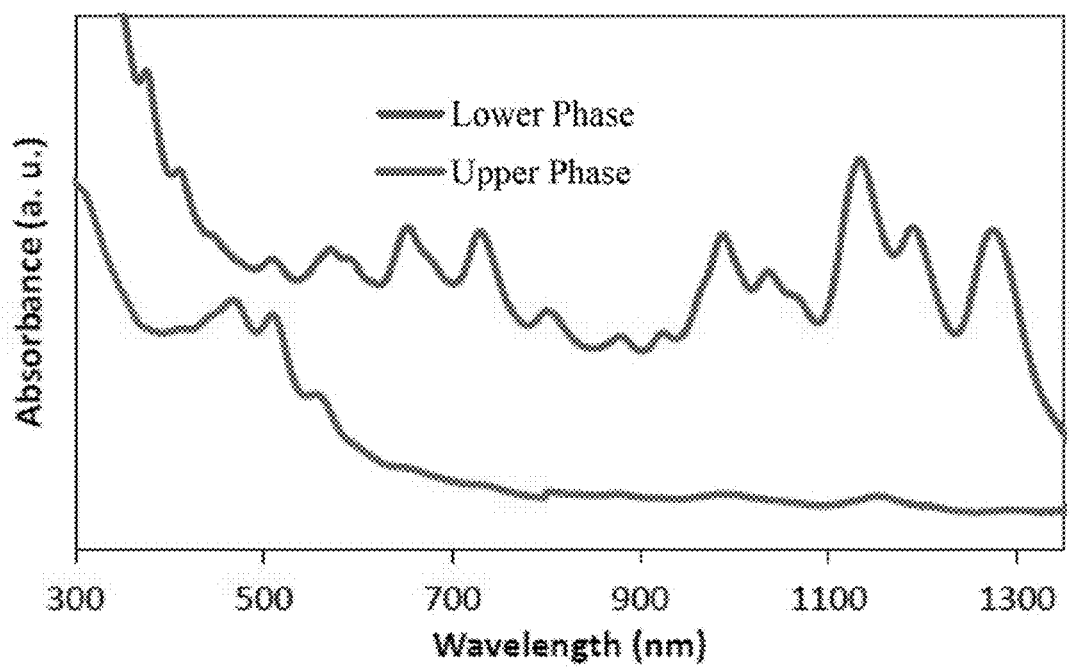
FIG. 4 shows a graph of absorbance versus wavelength for an upper phase and a lower phase from fractionating a nanoparticle composition obtained according to Example 1.

UV-Vis absorption spectra of the upper phase and the lower phase are shown in FIG. 4 for tube D, which had 1.0 µg/mL PVP. The spectra indicate that SWCNTs of different structure were present in the upper phase and the lower phase. Specifically, the absorption spectrum of the upper phase displayed prominent peaks in the spectral region at ~500 nm associated with metallic SWCNTs and had a few, low absorption intensity peaks from 900 nm to 1300 nm, which occurred due to absorption by semiconducting SWCNTs. Consequently, metallic SWCNTs were enriched in the upper phase having predominately PEG. Additionally, the upper phase became a near pure source of metallic SWCNTs as the concentration of PVP increased. The lower phase (predominately dextran) contained both metallic and semiconducting SWCNTs based on its absorption spectrum.

Example 2

Enrichment of Semiconducting SWCNTs

A sample of cSWCNTs was prepared as in Example 1 except the SWCNTs (average diameter of 1.4 nm) were made by arc discharge. An aliquot of the cSWCNTs sample was combined with dextran (68 kDa), polyethylene glycol (PEG, 6 kDa), and SDS to prepare a composition having 6 wt % dextran, 6 wt % PEG, 0.7 wt % SDS, based on a weight of the composition, and 10 µg/mL cSWCNTs. The composition was subjected to vortex mixing for 5 seconds and subsequently was centrifuged at 17,000 g for 30 seconds. Two phases (an upper phase and a lower phase) formed respectively having, as a dominant polymer, PEG (in the upper phase) and dextran (in the lower phase). The SWCNTs initially apportioned into the upper phase.

Figure 5:
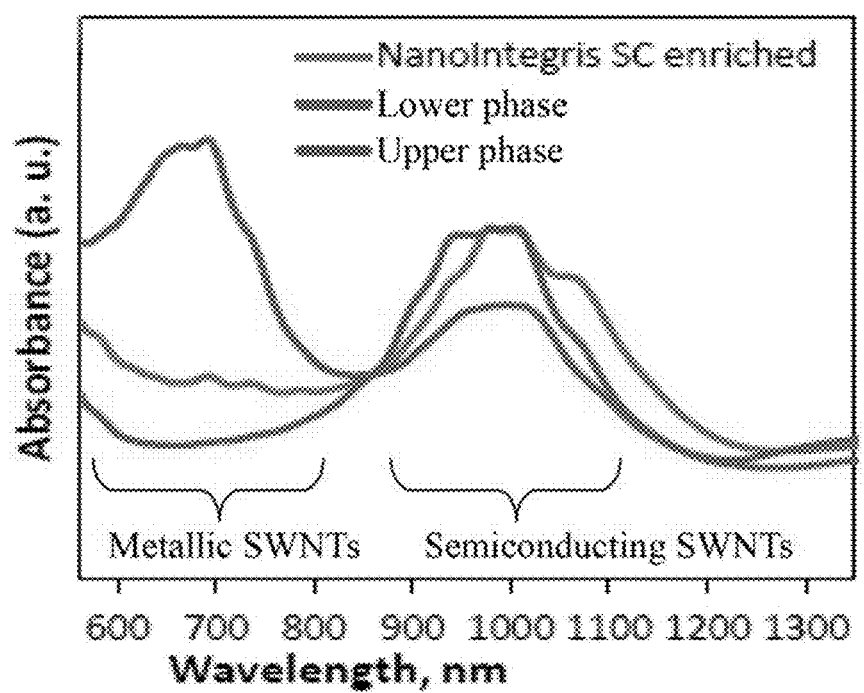
FIG. 5 shows a graph of absorbance versus wavelength for an upper phase and a lower phase from fractionating a nanoparticle composition obtained according to Example 2 and an absorption spectrum for a comparative nanotube sample.

Titration with 10 wt % sodium cholate (SC) induced transfer of some of the SWCNTs into the lower phase. At 0.9 wt % SC, metallic and semiconducting SWCNTs were apportioned into separate phases as indicated by the absorption spectra of the upper and lower phase shown in FIG. 5. For these cSWCNTs, the prominent peak at 1000 nm corresponds to semiconducting species. The peak at 700 nm corresponds to metallic species. Thus in the PEG phase, the metallic species are absent, while in the Dextran phase the semiconducting species are diminished. For comparison with the absorption spectra of the upper and lower phases that exhibit separation of metallic and semiconducting nanotubes, an absorption spectrum of a commercial semiconducting-enriched sample from NanoIntegris, Inc. was acquired and is also shown in FIG. 5. Thus, the SWNTs in the composition favorably separated into a phase having metallic SWNTS and a phase having semiconducting SWNTs.

Example 3

Diameter-Dependent Apportioning of Small-diameter SWCNTs

Figure 6:
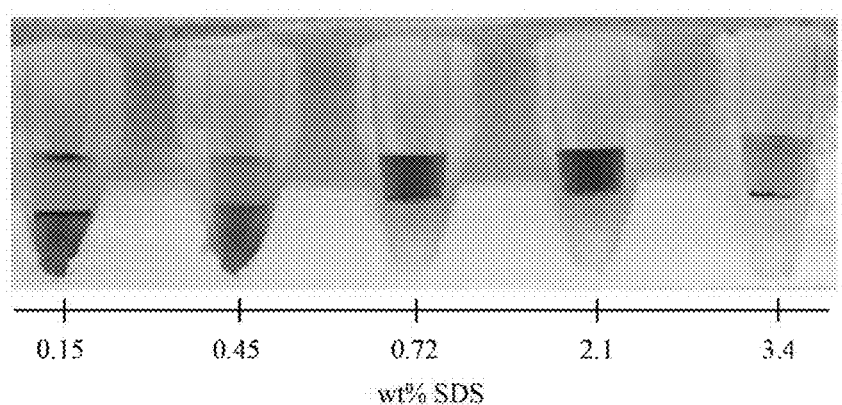
FIG. 6 shows a photograph exhibiting phase separation for tubes containing different amounts of sodium dodecylsulfate obtained according to Example 3.
Figure 7:
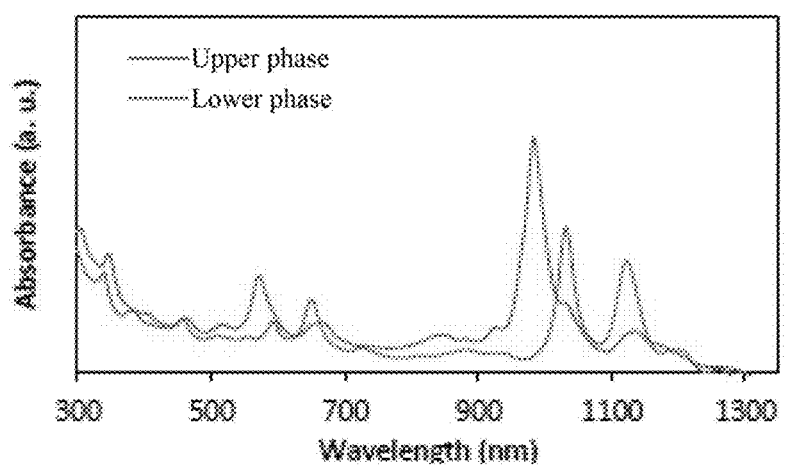
FIG. 7 shows a graph of absorbance versus wavelength for an upper phase and a lower phase from fractionating a nanoparticle composition obtained according to Example 3.

The composition was prepared as in Example 1 but using CoMoCAT synthesized SWCNTs (average diameter of 0.8 nm), SDS, PEG (6 kDa), and dextran (68 kDa), and sodium cholate. Here, the concentration of SDS in the composition was varied to achieve diameter-dependent separation of the SWCNTs. As with larger diameter SWCNTs of Example 2, the 0.8 nm diameter SWCNTs used here were combined with the PEG-dextran system and initially partitioned into the PEG phase (upper phase). However, at low surfactant concentrations (<0.5 wt % SDS), the SWCNTs partitioned into the lower phase (predominantly dextran). As shown in FIG. 6, the SDS concentration in the composition was 0.15 wt %, 0.45 wt %, 0.72 wt %, 2.1 wt %, or 3.4 wt % SDS, with polymer and SWCNT concentrations as in Example 1. For SDS concentrations below 0.5 wt %, SWCNTs apportioned in the upper phase and lower phase such that the top phase had a green color, and the bottom phase had a purple color. The color indicated that smaller diameter SWCNTs apportioned in lower phase, and larger diameter SWCNTs apportioned in the upper phase. This was confirmed by the absorption spectra shown in FIG. 7 acquired from the lower phase and the upper phase for the composition containing 0.15 wt % SDS. Here, the absorption spectrum of the upper phase had a most intense peak at 980 nm from small diameter SWCNTs corresponding to a (6,5)-SWCNT (0.76 nm diameter). The absorption spectrum of the lower phase had peaks at 1035 nm and 1120 nm, corresponding to (7,5)-SWCNTs (0.83 nm diameter) and (7,6)-SWCNTs (0.90 nm diameter). At the highest concentration of SDS (3.4 wt %), some subset of the (n,m)-SWCNTs precipitated to the interface between the upper phase and the lower phase.

In further experiments, SWCNTS were apportioned among an upper phase and a lower phase at higher SDS concentrations by introducing various additives (sodium cholate (SC) or sodium deoxycholate (SDC). At 0.65 wt % SDS and 0.06 wt % SDC, small-diameter SWCNTs transfer from the upper phase (predominantly PEG) to the lower phase (predominantly dextran). At 0.08 wt % SDC, the SWCNTs apportioned among the phases with an absorption spectrum comparable to FIG. 7. At 0.1 wt % SDC, a substantially all of the SWCNTs transfer into the lower phase. In the case of SC, greater concentrations were required, but the same apportionment of the SWCNTs was achieved.

Example 4

Length-dependent Partitioning of SWCNTs

Nanomaterial: SWCNTs from arc discharge synthesis method, 1.4 nm average diameter. Dispersant: sodium dodecyl sulfate (SDS). Immiscible phases: polyethylene glycol 6 kDa (PEG) and dextran, 68 kDa. Additive: sodium deoxycholate (SDC).

Figure 8:
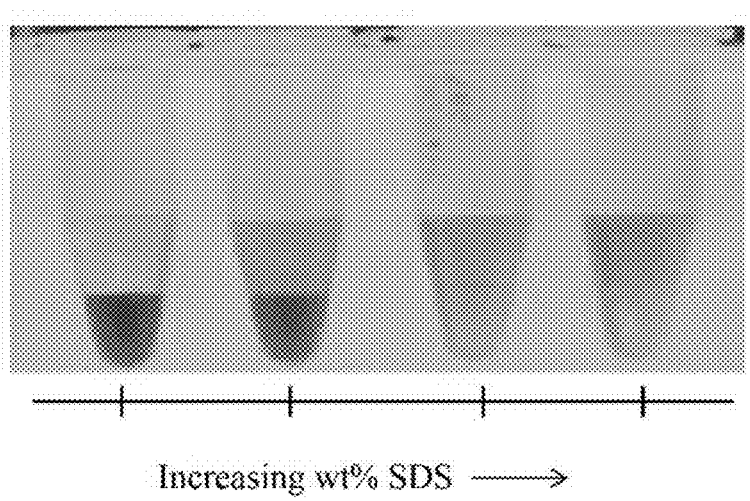
FIG. 8 shows a graph of absorbance versus wavelength for an upper phase and a lower phase from fractionating a nanoparticle composition obtained according to Example 4.
Figure 9:
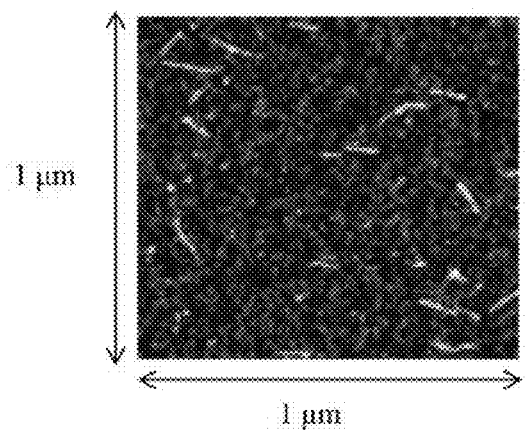
FIG. 9 shows a micrograph acquired from subjecting fractionated nanoparticles to atomic force microscopy in accordance with Example 4.
Figure 10:
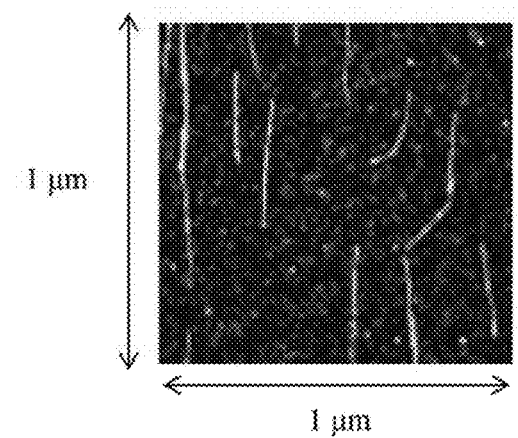
FIG. 10 shows a micrograph acquired from subjecting fractionated nanoparticles to atomic force microscopy in accordance with Example 4.

A composition was prepared as in Example 2 but sodium deoxycholate (SDC) was used in place of sodium cholate to achieve final concentrations as follows: 6 wt % PEG, 6 wt % dextran, 0.7 wt % SDS, 0.07 wt % SDS, 10 mg/mL SWCNTs. the partitioning which results is not sensitive to nanotube metallicity. With the presence of SDC instead of SC, the SWCNTs were apportioned in the upper phase and lower phase according to length of the SWCNTs rather than by metallicity. The relative apportionment of different length SWNTs depended upon the concentration of the SDS in the composition. Again, here the polymer in the lower phase was predominately dextran, and the polymer in the upper phase was predominately PEG. As shown in FIG. 8, as the concentration of the SDS increased, the apportionment of SWCNTs by length difference increased as indicated by the disappearance of the dark color in the lower phase. The size distribution difference between the upper phase and the lower phase was investigated by atomic force microscopy (AFM). As shown by the AFM micrograph of FIG. 9, shorter SWCNTs apportion in the lower phase as compared to longer SWCNTs that apportion in the upper phase as shown in the AFM micrograph of FIG. 10.

Example 5

Apportioning SWCNTs by Squeous Solvents

Composed of $H_2O/CH_3CH_2OH$ (50:50) as Solvent and Polyvinylpyrrolidone (PVP), Polyacrylamide (PAM) as Phase Separation Polymers A stock solvent of 50:50 (volume ratio) water-ethanol was prepared by volumetrically adding anhydrous $CH_3CH_2OH$ to 5 mL deionized water to produce a total volume of 10 mL. A 20 wt % PVP stock solution in $H_2O/CH_3CH_2OH$ (50:50) was prepared by adding the solvent to 1 g of PVP (average molecular weight $M_n$=10 kDa) for final volume of 5 mL. A 20 wt % PAM stock solution in $H_2O/CH_3CH_2OH$ (50:50) was prepared by delivering 2 mL of 50% -polyacrylamide (PAM) (average molecular weight $M_n$=10 kDa) in water, adding anhydrous $CH_3CH_2OH$ to an intermediate volume of 4 mL, and finally adding 1 mL of stock solution. A SWCNT stock solution was prepared by combining 1 mg of CoMoCAT SWCNTs with 1 mg of (GT)20 single-stranded DNA in 1 mL of 0.1 M NaCl and subjecting the SWNCT stock solution to sonication and centrifugation.

Figure 11:
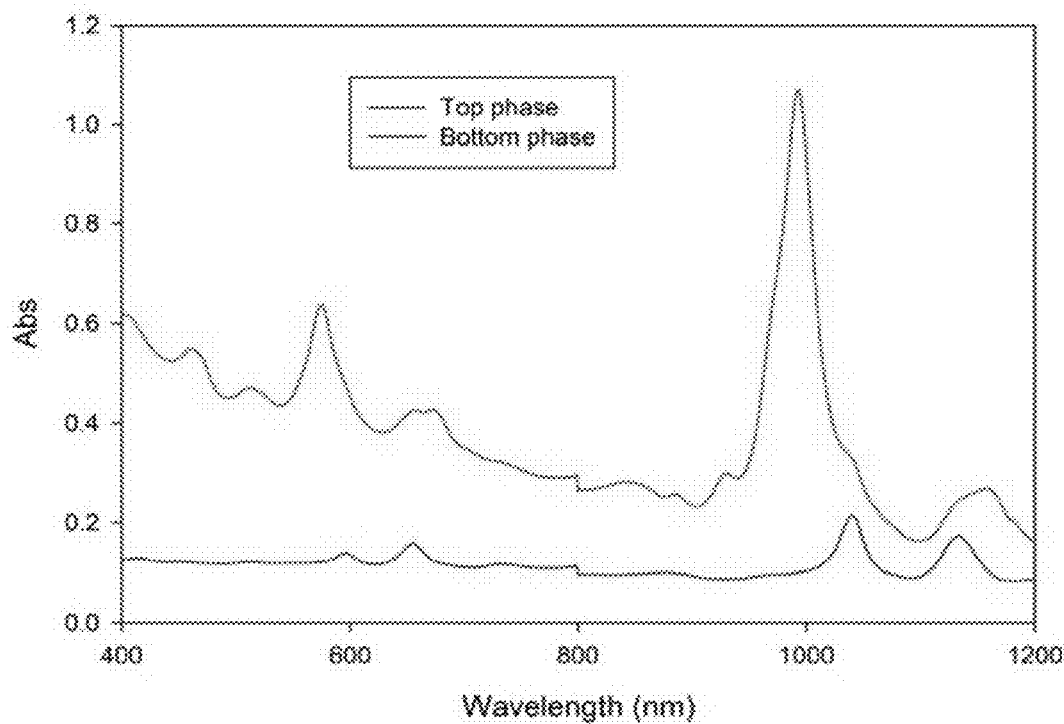
FIG. 11 shows a graph of absorbance versus wavelength for an upper phase and a lower phase from fractionating a nanoparticle composition obtained according to Example 5.

Two study the apportionment behavior of the SWCNTs in the water-ethanol solvent system, SWCNTs were disposed in a composition containing the water-ethanol solvent, PVP, and PAM by combining 100 μL of 20% PVP stock solution with 200 μL of 20% PAM stock solution in an Eppendorf tube, which was subjected to vortex mixing for 30 seconds and subsequently centrifuged at 3000 g for 30 seconds. Two phases formed with a volume of the upper phase to bottom phase of ~1:1. Thereafter, 10 μL of SWCNT stock solution was added to the composition and subjected to vortex mixing and centrifugation to facilitate phase separation. Optical absorption spectra of the upper phase and the bottom phase are shown in FIG. 11. Using the spectral data, the bottom phase was found to contain mainly (6,5)-SWCNTs, and the upper phase contained mainly (7,5)-, (7,6)-, and (8,4)-SWCNTs.

Example 6

Apportioning SWCNT with Organic $CH_3Cl$ Solvent

A 20wt % poly(butyl methacrylate) (PBMA) stock solution was prepared by combining 2 g PBMA (high molecular weight) in 10 mL $CHCl_3$. A 20% polystyrene (PS) stock solution, was prepared, by combining 2 g PS (average molecular weight $M_n$=150 kDa) in 10 mL $CHCl_3$. A stock solution of poly(9,9-di-n-dodecylfluorenyl-2,7-diyl) (PFO) and SWCNTs was prepared by combining 0.1 mg of HiPCO SWCNTs with 0.9 mg PFO in 1 mL toluene, followed by sonication and centrifugation. A poly[(9,9-dioctylfluorenyl-2,7-diyl)-alt-co-(6,6'-{2,2'-bipyridine})] (PFO-BPy)-CoMoCAT SWCNT stock solution was prepared by combining 0.05 mg of CoMoCAT SWCNTs with 2 mg PFO-BPy in 1 mL toluene, which was thereafter subjected to sonication and centrifugation.

Figure 12:
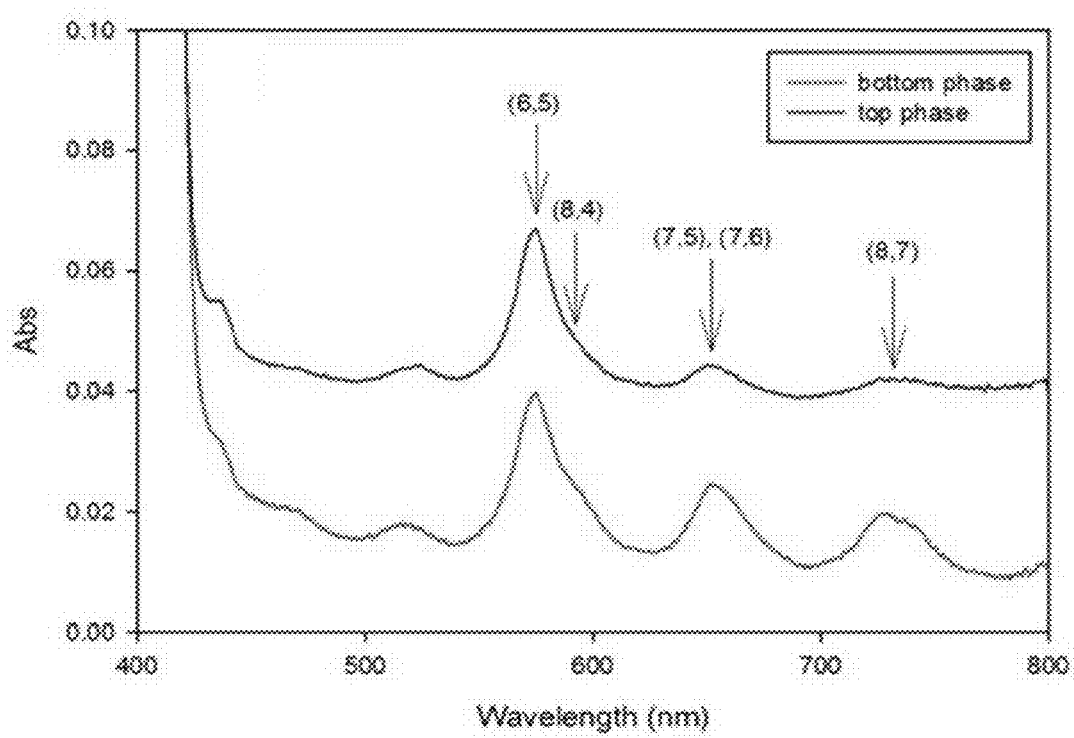
FIG. 12 shows a graph of absorbance versus wavelength for an upper phase and a lower phase from fractionating a nanoparticle composition obtained according to Example 6.

To study the apportionment behavior of the SWCNTs in the $CH_3Cl$ solvent, SWCNTs were disposed in a composition containing the PBMA and PS polymers by combining 100 μL of 20% PBMA stock solution, 100 μL of 20% PS stock solution, 40 μL of PFO/HiPCo SWCNT stock solution, and 60 μL of PFO-BPy/CoMoCAT SWCNT stock solution in an Eppendorf tube. The composition was subjected to vortex mixing for 30 seconds followed by standing at 25° C. by which phase separation occurred within 15 minutes. Two phases were present at a volume ratio of the upper phase to the bottom phase of ~1:1. Optical absorption spectra of the upper phase and the bottom phase were acquired and shown in FIG. 12. The spectrum of the top phase indicated, the presence of (6,5)-SWCNTs, and the spectrum of the bottom phase indicated the presence of (6, 5)-, (7,5)-, (7,6)-, (8,4)-, and (8,7)-SWCNTs. The spectra of the bottom phase and the upper phase (which are offset from one another in FIG. 12 for convenience of comparison) evidence apportioning the SWCNTs between the upper phase and the lower phase is dependent upon the (n,m)-SWCNT electronic effects relative to the predominant polymer in the $CHCl_3$ organic solvent.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for fractionating a nanoparticle composition, the process comprising:
    combining a first polymer, a second polymer, and a solvent to form a fluid;
    contacting the nanoparticle composition with the fluid, the nanoparticle composition comprising:
        a plurality of first nanoparticles; and
        a plurality of second nanoparticles,
            wherein the first nanoparticles and the second nanoparticles are a carbon allotrope, a derivatized carbon allotrope, or a combination comprising at least one of the foregoing;
    forming a multiphase composition comprising a first phase and a second phase by partitioning the first polymer and the second polymer such that a concentration of the first polymer is greater than a concentration of the second polymer in the first phase, and the concentration of the second polymer is greater than the first polymer in the second phase, wherein the solvent is present in the first phase and the second phase;
    apportioning the first nanoparticles and the second nanoparticles among the first phase and the second phase to fractionate the nanoparticles composition, based on a relative affinity of the first nanoparticles articles and the second nanoparticles for the first polymer and the second polymer;
    after apportioning the first nanoparticles and the second nanoparticles, removing a portion of the first phase from the multiphase composition;
    forming a secondary multiphase composition comprising a plurality of phases by:
        combining the first polymer, the second polymer, and the solvent to form a secondary fluid; and
        contacting the portion with the secondary fluid; and
    apportioning the first nanoparticles in the portion among the plurality of phases in the secondary multiphase composition,
    wherein the first nanoparticles are present in the first phase and substantially absent in the second phase, and the second nanoparticles are present in the second phase and substantially absent in the first phase.

2. The process of claim 1, further comprising forming a colloidal suspension of the first nanoparticles and the second nanoparticles, wherein the first nanoparticles and the second nanoparticles are disposed in the fluid as the colloidal suspension.

3. The process of claim 2, wherein forming the colloidal suspension comprises subjecting the nanoparticle composition to heating, shaking, sonicating, stirring, or a combination comprising at least one of the foregoing.

4. The process of claim 1, further comprising removing, from the multiphase composition, the first phase, the second phase, or a combination comprising at least one of the foregoing.

5. The process of claim 1, further comprising removing the first nanoparticles from the first phase, the second nanoparticles from the second phase, or a combination comprising at least one of the foregoing.

6. The process of claim 1, further comprising incubating the multiphase composition at a temperature from −20° C. to 110° C. for a time from 10 seconds to 48 hours.

7. The process of claim 1, further comprising changing a condition of the multiphase composition so that a portion of the first nanoparticles transfers to the second phase from the first phase, a portion of the second nanoparticles transfers to the first phase from the second phase, or a combination comprising at least one of the foregoing.

8. The process of claim 1, further comprising changing a concentration of the first polymer, the second polymer, or a combination comprising at least one of the foregoing polymers to decrease an amount of the first nanoparticle in the first phase or decrease an amount of the second nanoparticle in the second phase.

9. The process of claim 1, further comprising changing a temperature of the multiphase composition, a pH of the multiphase composition, a concentration of a salt in the multiphase composition, a concentration of a surfactant in the multiphase composition, a concentration of the solvent in the multiphase composition, or a combination comprising at least one of the foregoing.

10. The process of claim 1, wherein both of the first polymer and the second polymer are water soluble polymers or are water insoluble polymers.

11. The process of claim 10, wherein the first polymer and the second polymer are water soluble polymers, which independently comprise polyethylene glycol, polyacrylamide, dextran, polyvinyl pyrrolidone, a derivative of the foregoing, or a combination comprising at least one of the foregoing.

12. The process of claim 10, wherein the first polymer and the second polymer are water insoluble polymers, which independently comprise ethyl cellulose, hydroxypropyl ethyl cellulose, cellulose acetate phthalate, cellulose acetate, hydroxypropyl methyl cellulose phthalate, polystyrene, poly methyl methacrylate, poly butyl methacrylate, or a combination comprising at least one of the foregoing.

13. The process of claim 1, wherein the solvent comprises an aqueous solvent or a nonaqueous solvent,
wherein the aqueous solvent comprises water, an alcohol, an amide, an amine, an ether, a ketone, an aldehyde, an ester, a urea, a urethane, a sulfoxide, a sulfone, a sulfonamide, a sulfate, a thioether, a phosphine, a phosphite ester, a phosphate ester, or a combination comprising at least one of the foregoing, and
the nonaqueous solvent comprises an aliphatic hydrocarbon, an alcohol, an aldehyde, an amine, a nitrogen-containing polar solvent, a sulfur compound, an aromatic hydrocarbon, a carbonic acid ester, a carboxylic acid, an ester, an ether, an ether alcohol, an ether ester, a glycol ether ester, a halogenated hydrocarbon, a ketone, a phthalate, an oil, or a combination comprising at least one of the foregoing.

14. The process of claim 1, wherein the nanoparticle is a fullerene, a single-walled nanotube, a multi-walled nanotube, or a combination comprising at least one of the foregoing.

15. The process of claim 1, wherein a dispersant is disposed on an exterior surface of the first nanoparticles and the second nanoparticles, the dispersant comprising a polyether, a fatty acid sulfate, or a fatty acid sulfonate, a bile salt, polyvinyl pyrrolidone, a surfactant, a polymeric material, a flavin, a nitrogenous heterocyclic compound, a derivative thereof, or a combination comprising at least one of the foregoing.

16. The process of claim 15, wherein the dispersant is a cholate, a deoxycholate, a chenodeoxycholate, a taurodeoxycholate, a glycochenodeoxycholats, a ursodeoxycholate, a glycoursodeoxycholate, or a combination comprising at least one of the foregoing.

17. The process of claim 1, wherein the multiphase composition comprises a salt, a surfactant, or a combination comprising at least one of the foregoing,
wherein the salt comprises a mineral salt, a metal salt, an organic salt, a chaotropic salt, a kosmotropic salt, or a combination comprising at least one of the foregoing, and
the surfactant comprises a cationic surfactant, an anionic surfactant, a zwitterionic surfactant, a neutral surfactant, or a combination comprising at least one of the foregoing.

18. The process of claim 1, wherein the first nanoparticles and the second nanoparticles are substantially absent from an interface between the first phase and the second phase.

19. The process of claim 1, wherein the first polymer is dextran, polyvinylpyrrolidone, PBMA, or a combination comprising at least one of the foregoing;
the second polymer is polyethylene glycol, polyacrylamide, polystyrene, or a combination comprising at least one of the foregoing;
the first nanoparticle is a metallic carbon nanotube or a carbon nanotube having a diameter less than 0.8 nm;
the second nanotube is a semiconductor carbon nanotube or a carbon nanotube having a diameter greater than or equal to 0.8 nm;
the solvent is water, water-ethanol, or chloroform; and
an additive disposed in the fluid and comprises polyvinylpyrrolidone, sodium cholate, sodium deoxycholate, or a combination comprising at least one of the foregoing.

* * * * *